United States Patent
Matus et al.

(10) Patent No.: US 12,247,828 B1
(45) Date of Patent: *Mar. 11, 2025

(54) AUTONOMOUS VEHICLE TERRAIN PREDICTION AND DETECTION

(71) Applicant: RENU ROBOTICS CORP., San Antonio, TX (US)

(72) Inventors: Tim Alan Matus, San Antonio, TX (US); Michael Odell Blanton, Jr., San Antonio, TX (US); Kristopher Charles Kozak, San Antonio, TX (US); Marc Christopher Alban, San Antonio, TX (US)

(73) Assignee: RENU ROBOTICS CORP., San Antonio, TX (US)

( * ) Notice: Subject to any disclaimer, the term of this patent is extended or adjusted under 35 U.S.C. 154(b) by 399 days.

This patent is subject to a terminal disclaimer.

(21) Appl. No.: 17/882,303

(22) Filed: Aug. 5, 2022

Related U.S. Application Data

(63) Continuation of application No. 17/402,269, filed on Aug. 13, 2021, now Pat. No. 12,123,702, and a continuation-in-part of application No. 17/029,992, filed on Sep. 23, 2020, now Pat. No. 11,944,032, and a continuation-in-part of application No. 16/748,465, filed on Jan. 21, 2020, now Pat. No. 11,510,361.

(60) Provisional application No. 62/904,451, filed on Sep. 23, 2019, provisional application No. 62/918,161, filed on Jan. 17, 2019.

(51) Int. Cl.
*G01B 11/245* (2006.01)
*G01B 11/24* (2006.01)
*G01D 5/353* (2006.01)
*G02B 6/02* (2006.01)
*G02B 6/04* (2006.01)

(52) U.S. Cl.
CPC ........ *G01B 11/245* (2013.01); *G01B 11/2441* (2013.01); *G01D 5/35316* (2013.01); *G02B 6/02076* (2013.01); *G02B 6/04* (2013.01)

(58) Field of Classification Search
CPC .............. G01B 11/245; G01B 11/2441; G01D 5/35316; G02B 6/02076; G02B 6/04
See application file for complete search history.

(56) References Cited

U.S. PATENT DOCUMENTS

| | | |
|---|---|---|
| 5,204,814 A | 4/1993 | Noonan et al. |
| 7,668,631 B2 | 2/2010 | Bernini |
| 8,958,939 B2 | 2/2015 | Einecke et al. |
| 9,026,299 B2 | 5/2015 | Johnson et al. |
| 9,137,943 B2 | 9/2015 | Einecke et al. |
| 9,173,343 B2 | 11/2015 | Bernini |
| 9,848,529 B2 | 12/2017 | Franzius et al. |
| 10,104,837 B2 | 10/2018 | Hashimoto et al. |
| 10,321,625 B2 | 6/2019 | Einecke et al. |

(Continued)

*Primary Examiner* — Jaime Figueroa
*Assistant Examiner* — Zachary Joseph Wallace

(57) ABSTRACT

Disclosed are solutions for proactively sensing the condition of the ground in the path of the autonomous vehicle in order to mitigate the risks of an autonomous vehicle encountering troublesome terrain, navigation obstacles, and other potential risks to the continued uninterrupted operation of said autonomous vehicle. Accordingly, various implementations disclosed herein are directed to the use of ground analysis sensors to assist in the detection of navigationally difficult terrain including, for example, the use of cantilevered sensors operating well in front of the autonomous vehicle's front wheels (drive wheels or otherwise).

20 Claims, 14 Drawing Sheets

(56) References Cited

U.S. PATENT DOCUMENTS

| | | |
|---|---|---|
| 10,698,417 B2 | 6/2020 | Churavy et al. |
| 10,824,163 B2 | 11/2020 | Einecke et al. |
| 10,856,467 B2 | 12/2020 | Maggard |
| 10,888,046 B2 | 1/2021 | Gorenflo et al. |
| 2017/0108867 A1 | 4/2017 | Franzius et al. |
| 2021/0029873 A1 | 2/2021 | Yamauchi et al. |
| 2021/0059112 A1 | 3/2021 | Kim |
| 2021/0096574 A1 | 4/2021 | Lee et al. |
| 2021/0123742 A1 | 4/2021 | Yang et al. |
| 2021/0127569 A1 | 5/2021 | Gruhler et al. |
| 2021/0153428 A1 | 5/2021 | Mittmann et al. |
| 2021/0157327 A1 | 5/2021 | Lee et al. |

AUTONOMOUS VEHICLE TERRAIN PREDICTION AND DETECTION

CROSS-REFERENCE TO RELATED APPLICATIONS

This application is a continuation-continuation in part of, claims benefit of and priority to, and incorporates by reference herein in their entirety the following: pending U.S. patent application Ser. No. 17/402,269, filed Aug. 13, 2021, titled "AUTONOMOUS VEHICLE TERRAIN PREDICTION AND DETECTION"; pending U.S. patent application Ser. No. 16/748,465, filed Jan. 21, 2020, titled "SYSTEM AND METHOD FOR AUTOMATED GROUNDS MAINTENANCE", which in turn claims benefit and priority to U.S. Provisional Application No. 62/918,161, filed Jan. 17, 2019, titled "SYSTEM AND METHOD FOR AUTOMATED GROUNDS MAINTENANCE"; and pending U.S. patent application Ser. No. 17/029,992, filed Sep. 23, 2020, titled "AUTONOMOUS VEHICLE SYSTEMS AND METHODS", which in turn claims benefit and priority to U.S. Provisional Application No. 62/904,451, filed Sep. 23, 2019, titled "AUTONOMOUS VEHICLE SYSTEMS AND METHODS".

BACKGROUND

Safely traversing unknown or unfamiliar terrain is an important capability for autonomous vehicles and especially those traveling outdoors. For sustainable operations, an autonomous vehicle must be able to safely traverse the contours of the ground on which it travels. However, given the natural variation in ground in undeveloped and/or vegetative environments, the potentially drastic variations in surfaces and contours can be particularly challenging for an autonomous vehicle during outdoor operations on a variety of different types of ground.

SUMMARY

Disclosed herein are various implementations directed to proactively sensing the condition of the ground in the path of the autonomous vehicle in to order mitigate the risks of an autonomous vehicle encountering troublesome terrain, navigation obstacles, and other potential risks to the continued uninterrupted operation of said autonomous vehicle. Accordingly, various implementations disclosed herein are directed to the use of ground detecting sensors to assist in the detection of navigationally difficult terrain including, for example, the use of cantilevered sensors operating well in front of the autonomous vehicle's front wheels (drive wheels or otherwise).

More specifically, disclosed herein are various implementations directed to systems, processes, apparatuses, methods, computer-readable instructions, and other implementations for an autonomous vehicle to navigate over terrain by detecting a ground-based navigational obstacle in the direction of travel of the autonomous vehicle, determining a navigational solution for overcoming the detected navigational obstacle, performing the navigational solution to traverse the navigational obstacle and, for certain implementations, mapping the navigational obstacle for future reference by the autonomous mower. For several exemplary implementations the detecting may performed by a sensor that is, or that is located on, a cantilever of the autonomous vehicle that is forward of the autonomous vehicle relative to the direction of travel. For some implementations, the autonomous vehicle may be an autonomous mower the cantilever may be a cantilevered mowing deck.

For several implementations, the autonomous vehicle may be capable of elevating the cantilever and the navigational solution may comprise elevating the cantilever. Moreover, for select implementations: the detector may comprise a drop sensor for detecting a negative obstacle, and that drop sensor may comprise a ride wheel; and the detector may comprise a strain gauge, a bump bar, or other similar sensor for detecting a positive obstacle.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary and the following detailed description of illustrative implementations are better understood when read in conjunction with the appended drawings. For the purpose of illustrating the implementations, there is shown in the drawings example constructions of the implementations; however, the implementations are not limited to the specific methods and instrumentalities disclosed. In the drawings.

DETAILED DESCRIPTION

Figure 1A:
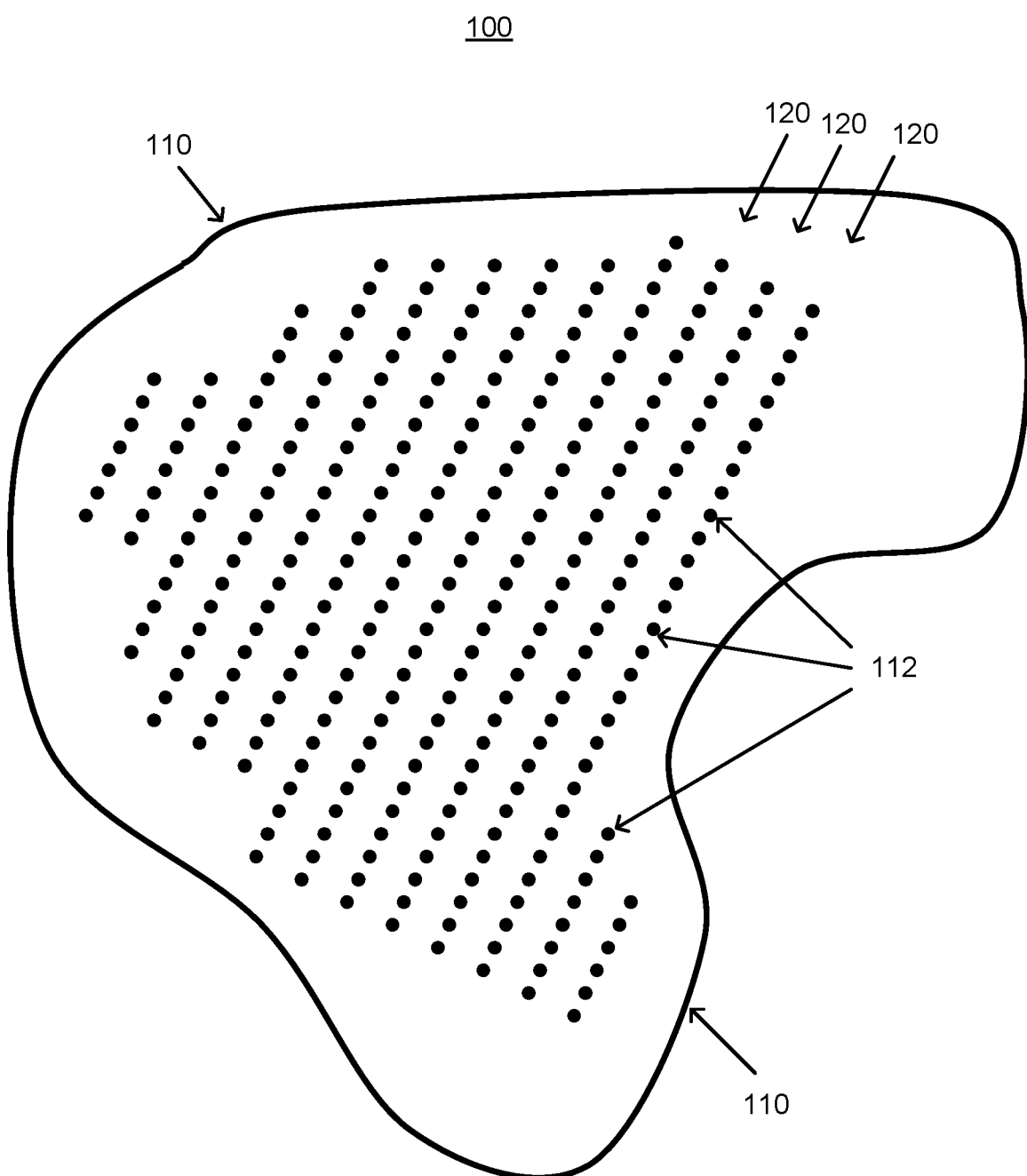
FIG. 1A is a general illustration of an exemplary operating site logically bounded and populated with well-ordered obstacles representative of a typical operating environment for the various implementations disclosed herein.

Disclosed herein are directed to proactively sensing the condition of the ground in the path of the autonomous vehicle in order to mitigate the risks of an autonomous vehicle encountering troublesome terrain, navigation obstacles, and other potential risks to the continued uninterrupted operation of said autonomous vehicle. Accordingly, various implementations disclosed herein are directed to the use of ground analysis sensors to assist in the detection of navigationally-difficult terrain including, for example, the use of cantilevered sensors operating well in front of the autonomous vehicles front wheels (drive wheels or otherwise).

An understanding of various concepts are helpful to a broader and more complete understanding of the various implementations disclosed herein, and skilled artisans will readily appreciate the implications these various concepts have on the breath and depth of the various implementations herein disclosed. Certain terms used herein may also be used interchangeably with other terms used herein and such terms should be given the broadest interpretation possible unless explicitly noted otherwise.

Exemplary Implementation

An autonomous vehicle representative of various implementations disclosed herein may make a 3D measurement of the environment using LIDAR or another vehicle-mounted sensor to yield data in the form of a point cloud containing position of various points in the environment relative to the sensor (e.g. solar panel surface, solar array support structure, ground, grass, other vegetation, people, etc.).

Single frame measurements for many sensors including LIDAR may not provide sufficient information to distinguish the target object (such as solar panels) from other objects in the environment. However, by aggregating sensor data as the vehicle moves a clearer representation of the environment can be obtained that can help fill in gaps in the measurements. Sensors such as many types of LIDAR can have large gaps between individual measurement points that are fixed relative to the sensor by moving the sensor. Moving the sensor can also provide close-up measurements of distant locations which can then be connected together via aggregation. While measurement performance can decline quickly as distance from the sensor increases, moving the sensor allows the environment to be observed from multiple locations and at a smaller distance for objects of interest toward which the autonomous vehicle can move.

When the measurements are sufficiently aggregated, the points associated with the panels can be segmented (separated) from the rest of the points. Multiple known methodologies can be used to do this, from using a simple height threshold (i.e., selecting all points above a certain height) to fitting mathematical planes to the data and removing outlying points (i.e., those that are far from the plane.) In this manner, the likelihood of misattributing points to the panels can be mitigated. In addition, removal of points associated with the ground is important to avoid mis-fitting planes to the data.

To fit the planes to the data, these mathematical planes—defined by a point on the plane and a 3D vector that is in a direction normal to the plane—can be fit to the remaining data. Random Sample Consensus (RANSAC) can then be used to find multiple distinct, non-co-planar, planes in a data set. Each plane with a minimum number of associated valid measured points, of course noting that any three points that are not all collinear can define a plane, and therefore requiring a much higher number of points are needed to ensure that the points correspond to a true approximately planar surface in the environment.

After identifying the points associated with distinct planes, the orientation of the panels can be determined based on the tilt and alignment of the panels based on the direction of the long edge using a combination of methods which might include detecting the edge directly, finding the major axis of the points associated with the panels, and/or using additional a priori data about the installed orientation of the panels. The cross-row extents of the panels are then determined by identifying the edges of the panels in the data in the cross-row direction. The a priori known size/shape of the panel sections can be used to refine these measurements. Finally, the centerline is fit to the center of the extents and aligned with the panels.

When the panels are movable and the pivot point is offset from the top surface of the panel, the centerline can be moved to the pivot based on the known geometry of the panels. Although this adjustment might only change the position estimate by a small amount, this offset may be crucial for yielding the desired positioning precision of the autonomous mower to get complete mowing coverage of the site without running into structures on the site.

Finally, the panel detection may then be used to determine the position of the autonomous mover relative to a row of solar panels. This measurement can be used in two ways: (1) it can be used to ensure that the robot maintains a safe distance from the structures; and (2) it can be used to provide a high precision measurement of lateral position (cross-row positioning) when GPS is unavailable and RTK corrections are unreliable. Therefore, by creating a map that stores the georegistered centerlines of the panels, the live measurements can be compared to the centerlines in the map and used to offset the estimated position of the vehicle on the map.

Autonomous Vehicles

Various implementations disclosed herein relate to autonomous vehicles (or "robots") such as, for example, mobile maintenance robots, autonomous mowers, or other such vehicles and devices that might be utilized for any purpose such as, for example, maintenance operations at renewable energy installations. Even in this narrow but representation example, however, such maintenance operations may include a diverse range of activities and tasks including without limitation mowing, spraying for pests, spraying insecticides, washing of solar panels, security monitoring of the area, replacement of failed components, or other maintenance operations including but not limited to inspections of combiner boxes, wire connections, or infrastructure (including solar panels), and where any such "inspections" may be with performed with multispectral cameras capturing image data within specific wavelength ranges across the electromagnetic spectrum.

For the various implementations herein disclosed, an autonomous vehicle may comprise a variety of sensors, such as (but not limited to) LIDAR (light detection and ranging), RADAR (Radio Detection and Ranging), IMU (inertial measurement unit), inertial navigation systems, temperature sensors, humidity sensors, noise sensors, accelerometers, pressure sensors, GPS (global positioning system), ultrasonic sensors, cameras or other sensors. LIDAR may include, in some examples, 3D laser scanning, or a combination of 3D scanning and laser scanning. The autonomous vehicle may implement autonomous navigation to traverse a work area using sensors for collision avoidance and adjusting routing as needed. The autonomous vehicle may be communicatively connected to a central management system through a GPRS (General Packet Radio Service) network or other cellular data network or cell-based radio network technology mobile network, an IEEE 802.11x wireless network or any other network modality. Any number of networks (of the same or different types) may be present and used in any combination suitable for performing any one or more of the methodologies described herein.

Autonomous Vehicle Navigation

One way of establishing a route for an autonomous vehicle to achieve complete coverage is to manually drive the route with the autonomous vehicle so that it can record the route and later repeat the traversal of said route. However, this method of training relies on the operator to select the route that the vehicle will follow and, in addition to the human effort required, the route selected by the operator may not be the most efficient route for the vehicle overall or in different operating conditions.

Alternative approaches to route development may based on simultaneous localization and mapping (SLAM) techniques. SLAM provides the capability to generate a map without human intervention combined with the ability to localize within this map, and self-localization of the autonomous vehicle can be performed even if the process of generating the map is still in progress. On the other hand, SLAM techniques work well in indoor environments where there are a lot of features and well-defined physical boundaries. In unbound outdoor environments, however, there are fewer navigational features for SLAM to reference thus making SLAM substantially less effective. Of course, while the terms "mapping" (i.e., locations of objects within an environment) and "positioning" (i.e., determining a location within an environment based on a map) might be distinguishable from "routing" (i.e., choosing a navigational path within an environment), these various terms are closely related and may be used interchangeably herein consistent with the idea that that navigating through an environment (i.e., following a route) requires an autonomous vehicle to know its location within the environment.

To help compensate for the shortcomings of SLAM, some autonomous mowing systems utilize a boundary wire to surround a mowing area and emit a weak electromagnetic signal that can be detected by the autonomous mower. While systems that use boundary wires may help increase the efficacy of SLAM, they have their own shortcomings. For example, defining a mowing area requires installing the boundary wire, which may be impractical for the large, remote areas on which renewable energy farms are often located. Similarly, redefining existing mowing areas requires reinstalling new wire in a new pattern, which again is impractical for many renewable energy farms. As such, while the use of a boundary wire may be suitable for relative small residential and small business environments, it is not suitable for utilization on a larger scale such as energy production sites.

It is possible to guide an autonomous vehicle with GPS-based localization along paths and routes. Paths are generally lines of travel which are defined in a way to allow the vehicle to safely traverse near and around static obstacles in the operating space. A path is considered to be a line that exists in real world space between two GPS coordinate points, and a path may have a start point and an end point defined by GPS coordinates (or other equivalents). A path can be either straight or curved, and is typically definable by some mathematical geometric construct such as a line or curve in two-dimensional space for example. As used herein, "GPS coordinates" or other coordinate-specific examples are exemplary only and should be understood to include any and all alternate coordinate sources such as other WGS84 coordinates (as used by GPS), any of the several known Cartesian coordinate frames, or other coordinate systems without limitation.

A path is used by the autonomous vehicle as a guide for driving. As the vehicle traverses along the path, the vehicle compares its position via GPS coordinates to the path and makes corrections as necessary to follow the path as accurately as the mechanical capabilities and/or precision of the sensors of the vehicle will allow. The autonomous vehicle may also incorporate other techniques to follow a path such as LIDAR-based localization and inertial navigation/dead reckoning (particularly in areas where GPS is unavailable or unreliable). For example, the panel-and-post (P&P) detection/localization methods described herein may be used as a specific implementation that utilizes LIDAR-based localization. Routes are considered to be a collection of paths, which are interconnected at nodes, where the nodes are either endpoints or intersection points between paths.

For example, certain implementations disclosed herein may utilize approaches for determining optimized task-specific routes such as mowing routes for an autonomous mower. Such implementations may use information about a site to automatically plan a mowing route for transit to and from a mowing region and the actual mowing of the region. Site information may include, for example, overhead/aerial/satellite imagery; CAD, blueprint or similar data that provides precise geometry and location of structures; data, such as from cameras, LIDAR, or other sensors that has been recorded on site using either sensors on the autonomous vehicle, or data from other sensors, such as from a survey-grade laser scan or a purpose-built data collection system; manually or automatically generated region, route or path information that explicitly indicates areas to drive and/or mow; and/or manually or automatically generated annotations or metadata to site data (of any type).

For some implementations, a mowing route may include two components: transit sections and mowing sections. Transit sections are paths where the autonomous mower moves from one area to another without mowing, and mowing sections are areas where the autonomous mower mows vegetation (e.g., has its cutting mechanism running). The mowing route may be optimized for distance, energy efficiency, and/or fastest effective mow rate (taking into consideration transit and recharge times) or other criteria.

Select implementations may also utilize a route network with annotated mowing regions, said route network including geometric or geographical points and connections between points along with relevant annotations or metadata. Any of several existing route-finding algorithms can be used with the route network to systematically find routes from one point to another within the network. Moreover, route-finding algorithms can solve for routes that optimize a specific metric (such as route length) when more than one viable route exists and multiple metrics are available from which to select.

In some instances it may be possible to predefine routes that provide full mowing coverage in mowing regions; however, such routes may not accommodate differences in the vehicle (such as if a smaller mower deck is used than when the original routes were created) or in the mowing parameters (such as if the desired path overlap changes). Additionally, in cases where mowing is performed in repetitive patterns (such as along multiple parallel rows), and where there is more than one entrance/exit to a mowing region (such as at both ends of a row of solar panels), the optimal entrance to a region and exit from a region may vary based on where the autonomous mower starts.

In addition, multiple methodologies can be used to generate a full route that includes an arbitrary number of transit regions and mowing regions. For example, one approach might minimize the total distance traveled (transit distance plus mowing distance) where the order in which the mowing regions are sequenced may be determined automatically. Another approach might sequence the mowing regions in a specified order where the length of transit is minimized or, in some alternative implementations, determined on-the-fly based on the entry/exit points of the regions.

For specific implementations, the paths to achieve full mowing coverage of a mowing region may be stored in a data store or, alternatively, computed on-demand (or on-the-fly) so as to achieve full coverage of the mowing region. For other implementations, the paths that are within the mowing region and the corresponding mow pattern—that is, the order in which the mow paths are traversed—may be computed on-demand or on-the-fly.

GPS/GNSS

Various implementations herein disclosed utilize GPS and/or other GNSS system for navigation and to support mapping of an operation site, and several such implementations may utilize more than one such GNSS and/or make use of multi-frequency receivers that support multiple or all of the deployed GNSS constellations.

A global navigation satellite system (GNSS) is a satellite navigation system with global coverage such as, for example, the U.S. Global Positioning System (GPS). Other examples of GNSSs include Russia's Global Navigation Satellite System (GLONASS), China's BeiDou Navigation Satellite System (BDS), and the European Union's Galileo system.

GPS provides geolocation and time information to a GPS receiver anywhere on or near the Earth where there is an unobstructed line of sight to a plurality of satellites—generally requiring at least three for basic location determinations and at least four to include an altitude determination—with greater accuracy being achievable with the inclusion of additional satellites (that is, more than four satellites) when possible. Satellite-emitted GPS signals are relatively weak, however, and can be easily blocked by mountains, buildings, or other obstacles, although this can also mitigated by the inclusion of additional satellites when possible.

High accuracy GPS/GNSS receivers can be used in many applications for high-accuracy, high-precision guidance of autonomous vehicles, and some implementations of high-accuracy GPS utilization may be supplemented by real-time kinematic (RTK) corrections. However, there are a number of common conditions that can result in degradation or complete unavailability of GPS signals when the GPS antenna's view of the sky above is blocked and a minimum number of satellites necessary for GPS positional determinations are not available. For example, such conditions can be common when operating in and around solar arrays, and particularly whenever driving underneath such arrays, where solar panels are elevated and reside atop posts having a substantially smaller footprint on the ground than the solar panels themselves. Therefore, in order to ensure continuous, reliable location determinations when GNSS measurements are lost or rendered inaccurate, other methods for localization are required.

Except where expressly stated otherwise, references made to GPS are non-limiting and are merely exemplary and representative of any and all GNSSs with no intention whatsoever to limit the disclosures herein to GPS alone but instead said references should be read as broadly as possible and inclusive of and equally applicable to any and all GNSSs. Moreover, any reference to a single GNSS system—and in particular any reference to GPS—should be deemed a reference to any GNSS individually or all GNSSs collectively.

LIDAR Technology

Technologies for "light detection and ranging" (LIDAR) or camera based localization are common supplemental or alternative localization approaches that can be utilized by autonomous vehicles. Such methods typically identify features (objects, patterns, locations, landmarks) in live sensor data and find correspondences in a georeferenced map containing similar data, or "reference points," to estimate position. The features in the environment that are used for determining position—these references points—are generally static and do not change over time.

A problem for using a standard version of this type of approach for localization at solar facilities is that very little of the visible infrastructure at the site is completely static. In many solar facilities, the panels are actively rotated to track the sun and, although the support structure is generally fixed, grass and vegetation in and around the solar panel posts can obscure the view of said reference points, as can the angled position of the solar panel positioned thereupon.

To address these challenges—and in the context of a solar arrays as an example of navigational obstacles for an autonomous vehicle (albeit ones that also just happen to be predictably ordered)—disclosed herein are approaches utilized by several implementations that can directly detect individual solar array panels and then determine the centerline of the panels (regardless of the tilt angle) which, in turn, can be used as a surrogate for solar panel post locations and the rows formed thereby. Based on these determinations, the distance of the autonomous vehicle from a centerline defined by these posts can then be used to estimate the global position of the robot and the intended path for it to traverse, as well as the proximity to any specific post as well as the lowest edges of the solar panels which may also pose as navigational obstacles to the autonomous vehicle.

LIDAR may use ultraviolet, visible, and/or near infrared light to image objects and can target a wide range of materials—including non-metallic objects, rocks, and even rain—in order to map physical features with high resolutions. For example, eye-safe 1550 nm lasers operating at relatively high power levels are common this wavelength is not strongly absorbed by the eye and because they are compatible with night vision technologies operating closer to the 1000 nm infrared wavelengths.

LIDAR uses active sensors that supply their own illumination source that hits objects and the reflected energy is detected and measured by sensors. Distance to the object is determined by recording the time between transmitted and backscattered pulses and by using the speed of light to calculate the distance traveled. LIDAR may also be employed using a spindle-type mechanism or something functionally similar in order to provide a 360-degree view of the environment around an autonomous vehicle as well as to continuously monitor and update this 360-degree view while the autonomous vehicle is in motion.

Applications of LIDAR (and other terrestrial laser scanning) can be either stationary or mobile, and the 3D point clouds acquired from these types of scanners can be used alone or matched with digital images taken of the scanned area from the scanner's location to create realistic looking 3D models in a relatively short time when compared to other technologies. Mobile LIDAR (and other mobile laser scanning) may comprise two or more scanners attached to a moving vehicle to collect data along a path. The data collected is organized as a 3D point cloud in which detected objects may be further processed, accurately located, and recognized from among different known categories or identities of possible and expected objects.

LIDAR mapping effectively produces an occupancy grid map through a process that uses an array of cells divided into grids and then stores the height values when LIDAR data falls into the respective grid cell. A binary map is then created by applying a particular threshold to the cell values for further processing from which the radial distance and z-coordinates from each scan can be used to identify which 3D points correspond to each of the specified grid cell and thereby leading to the process of data formation.

Autonomous Mowers

While it is generally desirable to have substantial ground cover on renewable energy facilities such as solar farms and wind farms, for example, for both aesthetic reasons and to mitigate ground erosion, improper maintenance of this ground vegetation can lead to overgrowth and result in reduced energy production, unsafe working conditions, and increased fire risk. To address this need, various implementations disclosed herein are directed to autonomous vehicles that may be a mobile maintenance system or, more specifically, an autonomous mowing system ("mower") that may include one or more blades disposed below a mowing deck coupled to a tractor.

One of the challenges with respect to solar farms is that the panels themselves can be static or continuously moving and may need to be close to the ground in order to perform optimally. Traditional mowing machines have insufficient vertical clearance to allow them to operate continuously without regard to the panel movement themselves, and traditional mowing technologies use a mowing surface that is wholly, or at least mostly, contained within the main wheelbase of the mower itself and having the wheels operating outside of the mowing surface. However, in this configuration a problem may arise because the physical plant (e.g., engine, drive motors, or other substantial physical components of the mower) may be necessarily disposed above the mowing surface, creating a mowing system that is still substantially high and reducing its utility in environments having low-to-the-ground obstacles.

To address these challenges, certain implementations disclosed herein this application—such as those implementations corresponding to the illustrations of FIGS. 7A, 7B, and 7C described in more detail later herein—may be directed to mobile automated maintenance systems designed to provide for low profile mowing that can pass under solar panels even when the solar panels are positioned (or oriented) with at least one edge close to the ground. This is achieved by disposing the mowing deck forward of (or behind) the primary physical plant that houses the drive system. The mowing deck may also be supported on the ground by wheels or cantilevered. Power may be provided through electrical connections to motors on the mowing deck to drive the mower blades. The mowing deck itself may be a low-profile mowing deck that has a substantially lower profile than the primary physical plant.

For several implementations, the height of the mowing surface may be changed using a mowing deck having an adjustable height. For example, a mowing deck may be mounted on hinge pins disposed on a tractor portion of the system, and a set of actuators may be adapted to move a vertical slide mounted to the hinge pins to provide for vertical adjustment with those actuators. In addition, or in the alternative, a mobile automated maintenance system can include a second set of actuators that might tilt the mowing surface.

The capability to lift/tilt the mowing surface provides a mobile automated maintenance system the enhanced capability to adapt to different contours of the ground and provides the advantage of level cutting of vegetation by the mowing system. The capability to lift or tilt the mowing deck can also be used to compensate for other conditions, such as, but not limited to, friction over ground or grass height or other conditions that require the mowing surface to be adapted, either in height or in tilt, on an ongoing basis. Other features may also enhance the mower's ability to adapt to different contours. For example, where the mowing deck is supported by wheels, the wheels may be operationally coupled to actuators that can be actuated to maintain a desired amount of force of the wheel or to lift a portion of the deck.

Autonomous Vehicle Variations and Configurations

For certain implementations, the autonomous vehicle may have four wheels with two positioned forward and widely dispersed to the outsides of the tractor and provide the driving force to propel the tractor and the system, including opposing propulsive force to facilitate turning. Two additional wheels may also be utilized and disposed to the rear of the tractor and provide stability. For alternate implementations, four wheels may be disposed at the corners of the tractor where all four are modified to provide propulsive force and/or turning capabilities to the autonomous vehicle. Other alternative implementations may instead employ a different number of drive wheels or guide wheels. Moreover, for a variety of implementations, the autonomous vehicle may be a low- or zero-turn vehicle, that is, a vehicle that can achieve a small turn radius or a turn radius that is effectively zero.

The various implementation disclosed herein may operate on battery-stored electrical power for which a charging system for the autonomous vehicle is provided in any of several different configurations and having a variety of different features. For solar farm and wind farm installations, for example, the charging system may operate on electrical power produced by the farm; however, because there may be times when maintenance is required when the sun is obscured or wind calm and such power is not available- or, more commonly, when the site may not allow for utilization of the power produced by the site or when the site is not a power-producing site-several such implementations are directed to a charging system for an autonomous vehicle may be configured to rely on other power sources, may generate its own power, or may store and transport power from other locations and other sources for utilization by or replenishment of the autonomous vehicle when needed.

Although certain implementations described herein are specifically directed to mobile automated maintenance systems and related methods for facilities and installations on a large acreage where ground cover is desired to prevent soil/ground erosion, provide pleasing aesthetics, or for other reasons, and that these implementations may be discussed primarily in terms of maintenance operations at solar farms (or other renewal energy sites such as those for wind turbine farms, ash ponds, or other facilities or installations), it will be readily understood and well-appreciated by skilled artisans that the various implementations described herein have broad applicability to other utilizations and are not limited to renewable energy or power generation facilities or installations in any way whatsoever. Instead, the various implementations disclosed herein should be broadly understood to be applicable to utilizations beyond renewable energy and also should be understood as disclosing such utilizations in the broadest contexts possible consist with the disclosures made herein.

Operational Sites

FIG. 1A is a general illustration 100 of an exemplary operating site 110 logically bounded and populated with well-ordered obstacles 112 (here shown as a plurality of rows 120) representative of a typical operating environment for the various implementations disclosed herein. More specifically, in this example, the operating site is a large outdoor area, unbounded by physical limits (i.e., no fences or other physical barriers defining the outer limits of the open space) but have corresponding logical boundaries defined by location data (e.g., a series of continuous location values that together provide an unbroken limitation to the operating site) corresponding to the area shown as the operating site 110 in FIG. 1A.

The well-ordered obstacles 112 of FIG. 1A may be any physical object that might impact navigation of the autonomous vehicles. For example, each well-ordered obstacle 112 shown in FIG. 1A might correspond to solar panel post locations which, as illustrated in FIG. 1A, form a plurality of rows 120 (which is not uncommon for a solar farm) and where the ability of an autonomous vehicle to navigate the operating site 110 for such a solar farm is at least limited by the location of the fixed solar panel posts, if not the solar panels themselves as well.

Figure 1B:
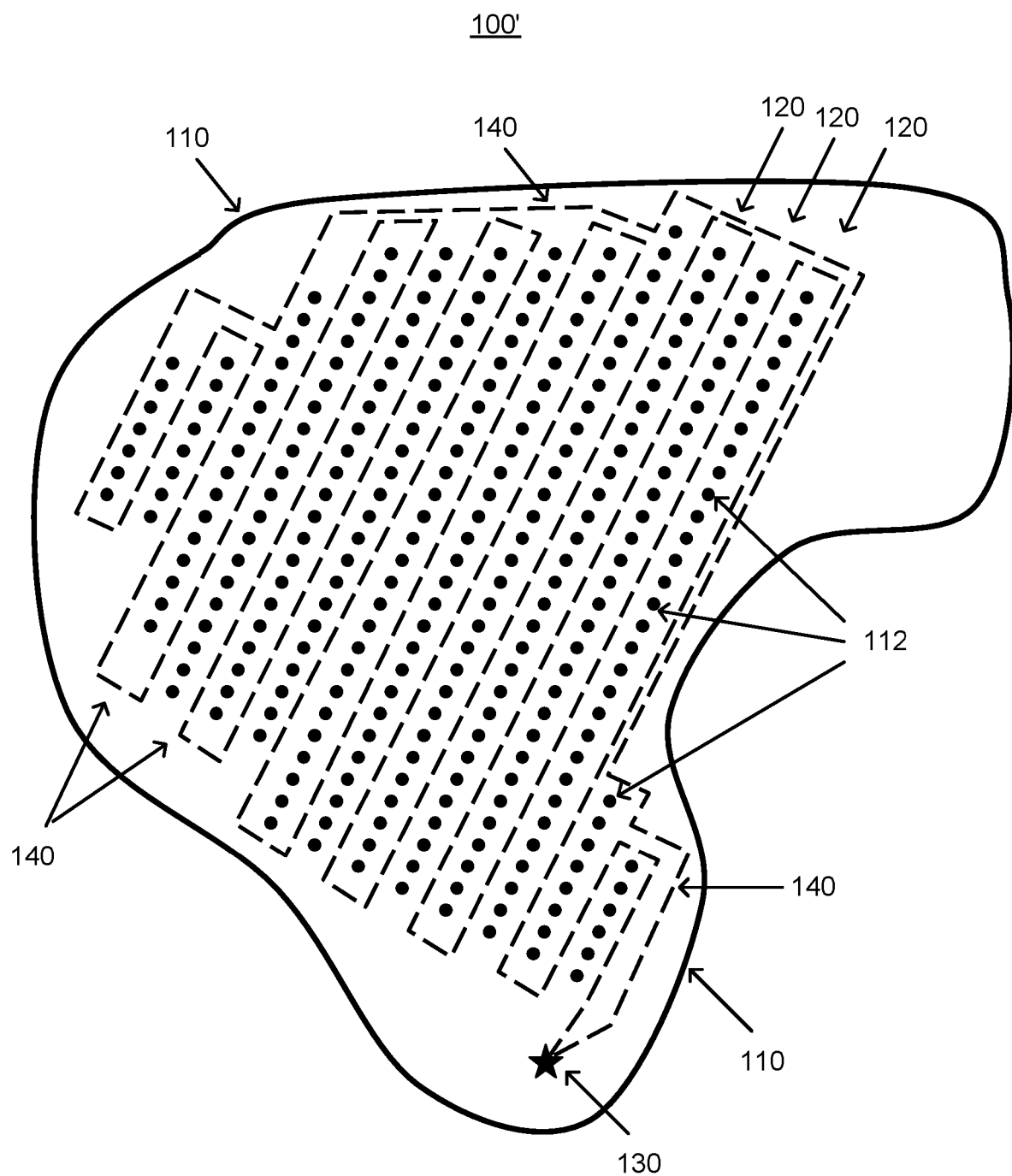
FIG. 1B is a general illustration of the exemplary operating site of FIG. 1A superimposed with a simple operational path plan for navigating among and between the well-ordered obstacles of the operating site representative of the various implementations disclosed herein.

FIG. 1B is a general illustration 100' of the exemplary operating site 110 of FIG. 1A superimposed with a simple operational path plan 140 for navigating among and between the well-ordered obstacles of the operating site representative of the various implementations disclosed herein. In FIG. 1B, an autonomous vehicle may randomly navigate within the logical boundaries of the operation site 110 to detect and determined fixed reference locations for the solar panel posts 112 and develop the operational path plan 140 so as to navigate amongst and between the rows 120 formed by the posts 112. As shown in this FIG. 1B, the operational path plan 140 may have the autonomous vehicle depart and return to a single fixed point 130 although in alternative implementations the start point and end point may be different, may be dynamic, may be random, and so forth. Notably, the operational path plan as shown is highly simplified for illustrative purposes only; a more extensive path plan is also anticipated based on the extensive disclosure of the parent applications to which priority is claimed and the contents of which have been incorporated herein by reference.

Solar Panels and Posts (SP&P)

Figure 2A:
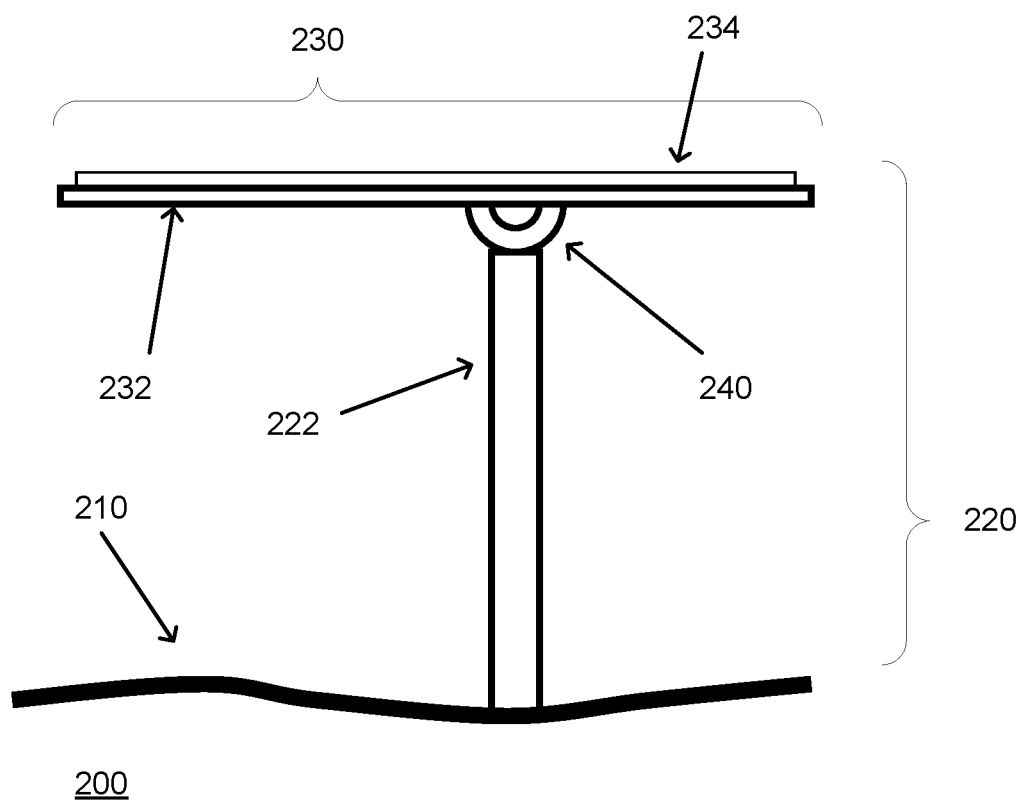
FIG. 2A is an illustration of an exemplary dynamic object-specifically, a solar panel fixed atop a solar panel post—that might exist in the operating environment illustrated in FIG. 1A.

FIG. 2A is an illustration 200 of an exemplary dynamic object 220—specifically, a solar panel 230 fixed atop a solar panel post 222 via an orientable coupling 240—several of which might be emplaced in the ground 210 of the operating environment 110 illustrated in FIG. 1A. The solar panel 230 may comprise a backing surface 232 and an energy capture surface 234 where the latter is purposefully highly absorbent (and minimally reflective) of electromagnetic energy generated by the sun to produce electrical power. Wires (not shown) carrying the produced electrical power from the solar panel 230 to an on-site collection/transmission facility (not shown in FIG. 2A or in FIG. 1A) may run centrally down the post 222 and underground or, although not illustrated as such, may be provided overhead or in some other fashion.

As shown in the side view of the solar panel 230 and post 222 illustrated in FIG. 2A, the solar panel 230 may be oriented horizontally, with all edges equally distant above the ground 210, such as for collecting sunlight when the sun is directly overhead, for non-operating storage of the solar panel 230 at night or other low-light conditions, or to support cleaning or maintenance operations including those that might be undertaken by an autonomous vehicle such as an autonomous mower or a mobile maintenance vehicle.

It should be noted that while the orientable coupling 240 may be offset from the geometric center of the backing surface 232 of the solar panel 230 as shown in FIG. 2A (as well as in FIGS. 2B, 4B, and 5B, each described later herein), for alternative solar panels (not shown) the orientable coupling 240 may be geometrically centered on the backing surface 232. However, regardless of whether the orientable coupling 240 is centered or offset on the backing surface 232 of the solar panel 230, the orientable coupling 240—and, by extension, the location of the portion of the backing surface 232 to which the orientable coupling 240 is attached, as well as the corresponding portion of the energy capture surface 234—is, for most practical purposes, statically located in the same location as the solar panel post 222 to which the orientable coupling 240 is affixed. In other words, the orientable coupling 240, the portion of the backing surface 232 to which it is attached, and the corresponding portion of the energy capture surface 234 are always co-located with the solar panel post 222 to which the orientable coupling 240 is attached. As such, as long as the location and orientation of the solar panel 230 can be detected by an autonomous vehicle, it is possible to determine—as done by various implementations disclosed herein—the location of the corresponding post 222 even when such a post 222 cannot be directly detected by the autonomous vehicle.

Figure 2B:
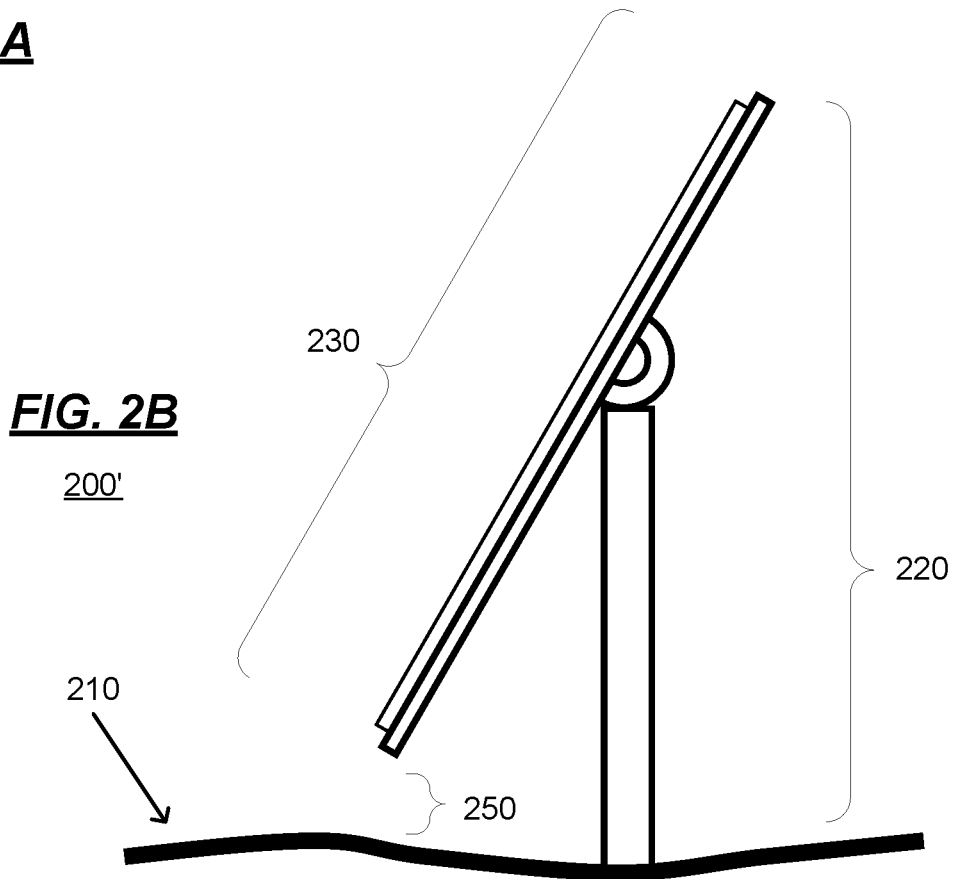
FIG. 2B is an illustration of the exemplary dynamic object of FIG. 2A in an alternate orientation whereby said dynamic object-specifically, the solar panel—may itself become an obstacle to navigation in the operating environment illustrated in FIG. 1A.

FIG. 2B is an illustration 200' of the exemplary dynamic object 220 of FIG. 2A in an alternate orientation whereby said dynamic object 220—specifically, the solar panel 230—may itself become an obstacle to navigation in the operating environment illustrated in FIG. 1A because at least one edge of the solar panel 230 is at a reduced distance 250 above the ground 210 under which an autonomous vehicle—such as the tractor portion of an autonomous mower, if not the mowing deck itself—may be too high to pass underneath.

In addition to changing its angle relative to the ground 210, the solar panel 230 may also rotate from side to side (not shown) in order track the sun during its course through the sky. As is well-known and readily appreciated by skilled artisans, such lateral and vertical movements are common and desired for self-orienting solar panels 230 to maximize the exposure of the energy capture surface 234 and in turn maximize energy production. In this manner, the solar panel 230 constitutes a "dynamic object" insofar as it may or may not be an obstacle to an autonomous vehicle depending on its orientation at any given time, as well as because when oriented in a manner that it is an obstacle the solar panel 230 may be in different rotational positions vertically, laterally, or both and thus may constitute an obstacle in different locations at different times, thereby requiring real-time monitoring and determinations of whether the solar panel 230 is an obstacle (due to its orientation) as well as where that obstacle is actually located, albeit within a reasonable distance from the "fixed obstacles" represented by its associated post 222.

Figure 3:
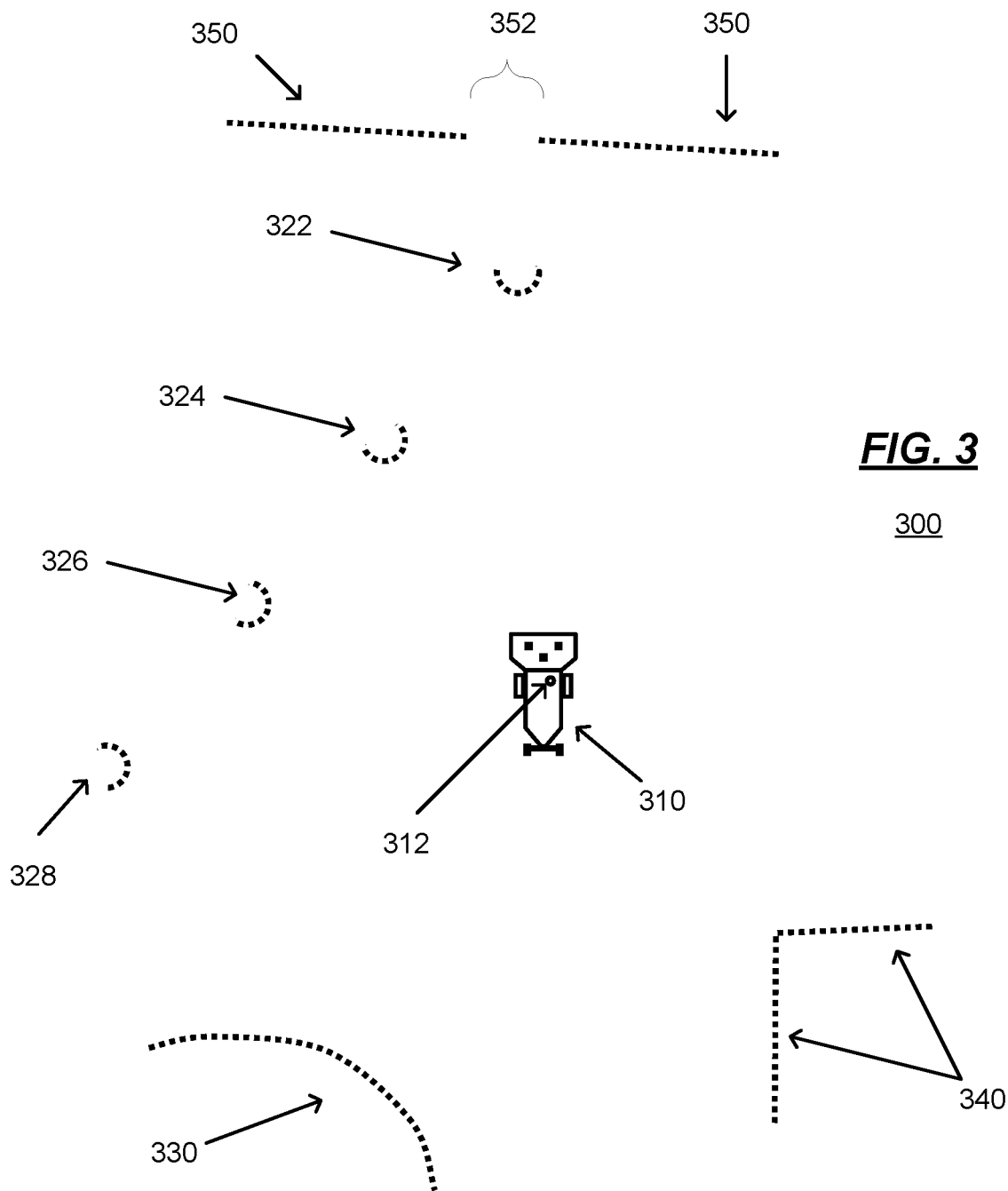
FIG. 3 is a diagrammatic illustration, representative of the various implementations disclosed herein, of an autonomous vehicle sensing for obstacles in its operating environment such as, for example, an autonomous mower using LIDAR to sense for solar panels, solar panel posts, and other obstacles on a solar farm said autonomous mower may be tasked to mow.

Notably, while the movement of the solar panel 230 precludes it from being a static location reference point (a.k.a., "fiducial" or "landmark") for purposes of navigation by an autonomous vehicle, specific implementations disclosed herein are directed to the use of "dynamic fiducials" such as a self-orienting solar panel 230 that locate itself within a relatively small footprint of locations and also exhibits other detectable features-such as the orientation angle and rotation—that can be used to extrapolate a static location reference point such as, for example, the location corresponding to the solar panel post 222 the location of which might not be directly detectable as discussed in more detail with regard to FIG. 3. Stated differently, by detecting the variable location and orientation (both vertically and laterally) of a solar panel 230, the corresponding solar panel post 222—and, by extension, the location of that corresponding solar panel post—can be mathematically determined when it is known (e.g., by manual input, by earlier detection, etc.) where the post 222 is operationally coupled to the solar panel 230 which is generally consistent for all such solar panels 230 on a solar farm.

Panel and Post (P&P) Detection

Certain autonomous vehicles may need to operate on sites having obstacles around which the autonomous vehicle must navigate, and sometimes in close proximity thereto. These obstacles may be numerous and well-ordered (e.g., into rows such as solar panels and posts on a typical solar farm) or disparately located and unordered (e.g., to match terrain like windmills on a typical wind farm). However, the known location of these obstacles may not be enough for autonomous vehicle to get close enough to perform its designated tasks.

For example, an autonomous mower on a solar farm may need to detect both solar panels and posts (SP&Ps) in order to navigate and mow as closely as possible to each SP&P. However, even when the GPS coordinates of each SP&P are known, the limits of GPS, both in precision and in availability, may not enable the autonomous mower to navigate to within the desired proximity of each such obstacle. In the context of a solar farm, this challenge may be exacerbated the solar panels changing orientation and angle to achieve optimal exposure to sunlight, the lower edge of each said solar panel possibly creating an occasional dynamically-changing navigational obstacle to the autonomous mower, while the posts upon which the solar panels are mounted may themselves may be obscured by vegetation growth and therefore difficult to directly detect by other conventional locating, detection, and sensing means. Moreover, the dynamic solar panels can also block GPS signals from reaching the autonomous mower, requiring said mower to rely on other sensing devices and geo-location systems for location and orientation control and obstacle avoidance.

As such, various implementations disclosed herein are directed to systems and methods for detecting, by an autonomous vehicle, dynamic obstacles that change position or obstruct navigation (or the performance of tasks) as well as determine the location of obstacles that exist but cannot be directly observed by on-board sensing systems in order to enable said autonomous vehicle to navigate and/or perform tasks within a desired proximity of said obstacles as well as support initial operating site setup and other tasks.

Further disclosed herein are various implementations directed to solutions for an autonomous vehicle to real-time detect and determine dynamic and/or obscured obstacles to support navigation and services to within a desired proximity of said obstacles. Certain such implementations are specifically directed to autonomous mowers, for example, to real-time detect and determine location and orientation of solar panels in a solar farm and, based on the location and orientation of such solar panels, determine the location of their corresponding posts that may be otherwise obstructed from direct detection by the autonomous mower's other sensing systems. Specific implementations are directed to initial operating site setup, operational path planning, subsequent site navigation without GPS, and other related tasks.

FIG. 3 is a diagrammatic illustration 300, representative of the various implementations disclosed herein, of an autonomous vehicle 310 sensing for obstacles in its operating environment such as, for example, an autonomous mower using LIDAR 312 to sense for solar panels, solar panel posts, and other obstacles on a solar farm said autonomous mower may be tasked to mow. In FIG. 3, the autonomous vehicle 310 comprises LIDAR 312 as a detecting device with a known offset relative to the physical edges of said autonomous vehicle 310. Using LIDAR 312—and disregarding readings that correspond to navigable ground—the autonomous vehicle 312 detects the point location and distance of several physical objects including solar panel posts 322, 324, 325, and 328, the solar panels themselves (not shown but discussed in more detail with regard to FIGS. 4A, 4B, 4A, and 5B), a round obstacle 330 of some sort or fashion (such as a rock pile, for example), the corner and facing surfaces of a rectangular object 340 (which may be a building, a vehicle, a recharge station, etc.), and a flat well-like surface 350 partially obscured 352 from the LIDAR by a solar panel post 322.

Although illustrated as a top-down 2D view, the data collected by the autonomous vehicle 310 using LIDAR 312 may be 3D and may range up from the ground to some angle and corresponding increasing height (e.g., 30-degrees). For a spinning LIDAR column comprising 16 vertically arranged laser emitting/detecting elements, for example, the LIDAR could collect 360-degree data from a 30-degree field in vertical increments separated by 2-degrees each and which-due to the motion of the autonomous vehicle 310, slightly altering the vertical angle of the LIDAR 312 by some mechanical means throughout the course of several subsequent and/or continuous 360-degree rotations (that is, "wobbling" the LIDAR column), or otherwise traversing the two-degree separation of the LIDAR elements during subsequent detection passes by some other means—provide data to fill in these two-degree gaps in sensing. This vertical gap-filling, as well as the naturally changing angles and view obtainable by the motion of the autonomous vehicle 310 as it traverses the operating site 110, can produce a comprehensive point cloud of the objects and potential obstacles located at the operating site 110 including solar panels 230 and solar panel posts 222.

Figure 4A:
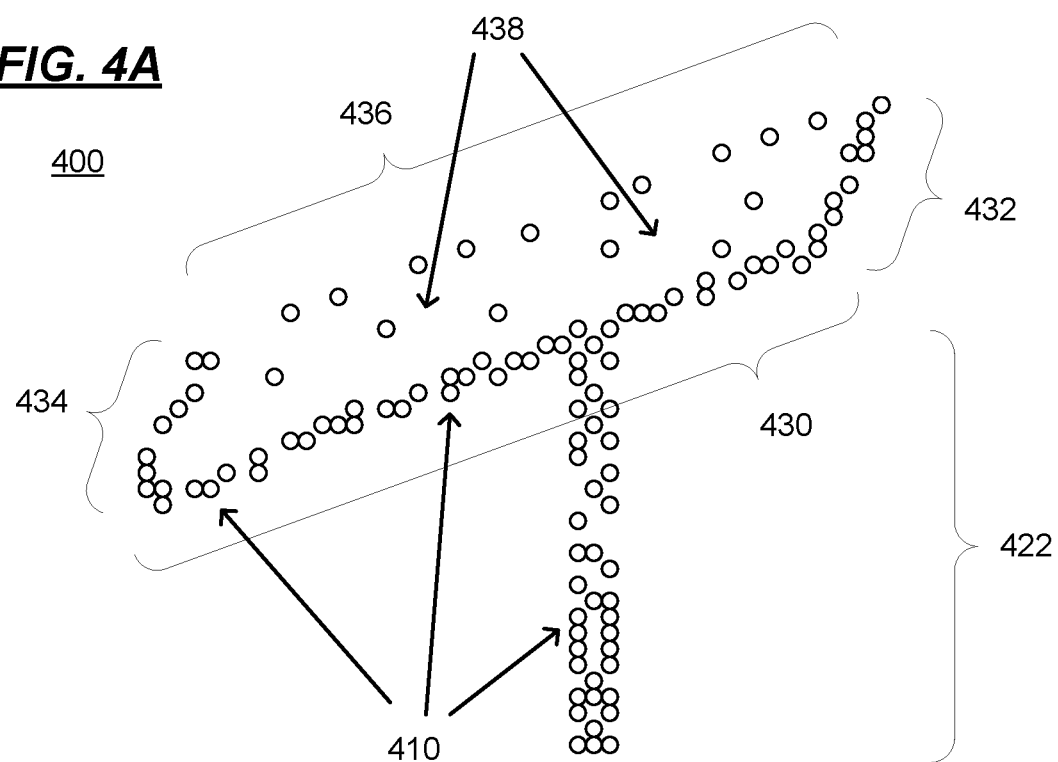
FIG. 4A is an illustration of exemplary detection of objects in an operating site—in this example, the LIDAR data points corresponding to a solar panel and post-representative of the various implementations disclosed herein.
Figure 4B:
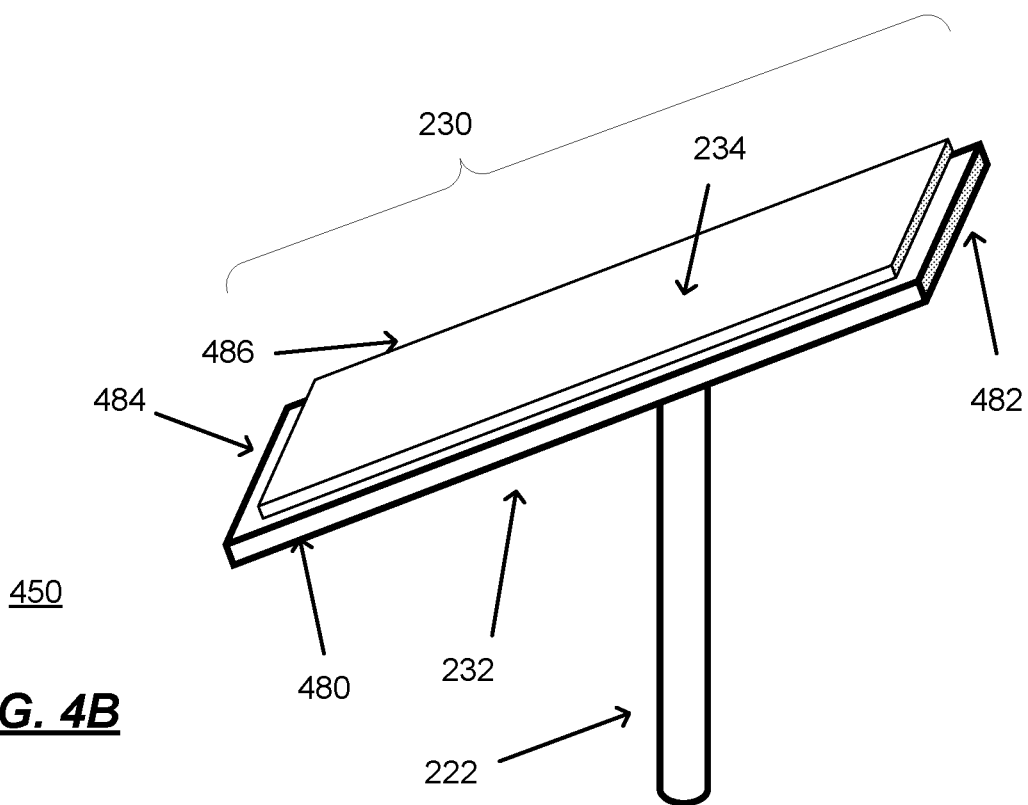
FIG. 4B is an illustration of the solar panel and post detected in FIG. 4A in a manner representative of the various implementations disclosed herein.

FIG. 4A is an illustration 400 of exemplary detection of objects at an operating site 110—in this example, LIDAR 312 data points 410 corresponding to the solar panel and post illustrated in FIG. 4B—representative of the various implementations disclosed herein. In FIG. 4A, the data points 410 coalesce around reflective vertical component 422 and reflective angled components 430, 432, and 434 as well as a detected but substantially non-reflective surface 438 extending to a determinable outer edge 436.

FIG. 4B is an illustration 450 of the solar panel 230 and post 222 detected in FIG. 4A in a manner representative of the various implementations disclosed herein. As shown in FIG. 4B, and with regard to FIG. 4A, the reflective vertical component 422 corresponds to the solar panel post 222 while the reflective angled components 430, 432, and 434 correspond to edges 480, 482, and 484 of the solar panel 230. Furthermore, the detected but substantially non-reflective surface 438 corresponds to the intentionally minimally-reflective (that is, intentionally maximally-absorptive) energy capture surface 234 including its outer edge 486.

Notably, if the solar panel 230 and its energy capture surface 234 was facing away from the LIDAR 312 such that the backing surface 232 was instead obliquely facing the LIDAR 312—that is, that the surface detected by the LIDAR 312 was instead the backing surface 232—the point cloud for this surface would be denser akin to how the edges 430, 432, and 434 comprise denser detection points. In this manner, the LIDAR data points 410 can be used to determine if the solar panel is facing the LIDAR or facing away from the LIDAR which, in turn, enables accurate location determinations for the lower edge of said solar panel which may constitute an obstacle to an autonomous vehicle (as discussed in detail elsewhere herein).

Figure 5A:
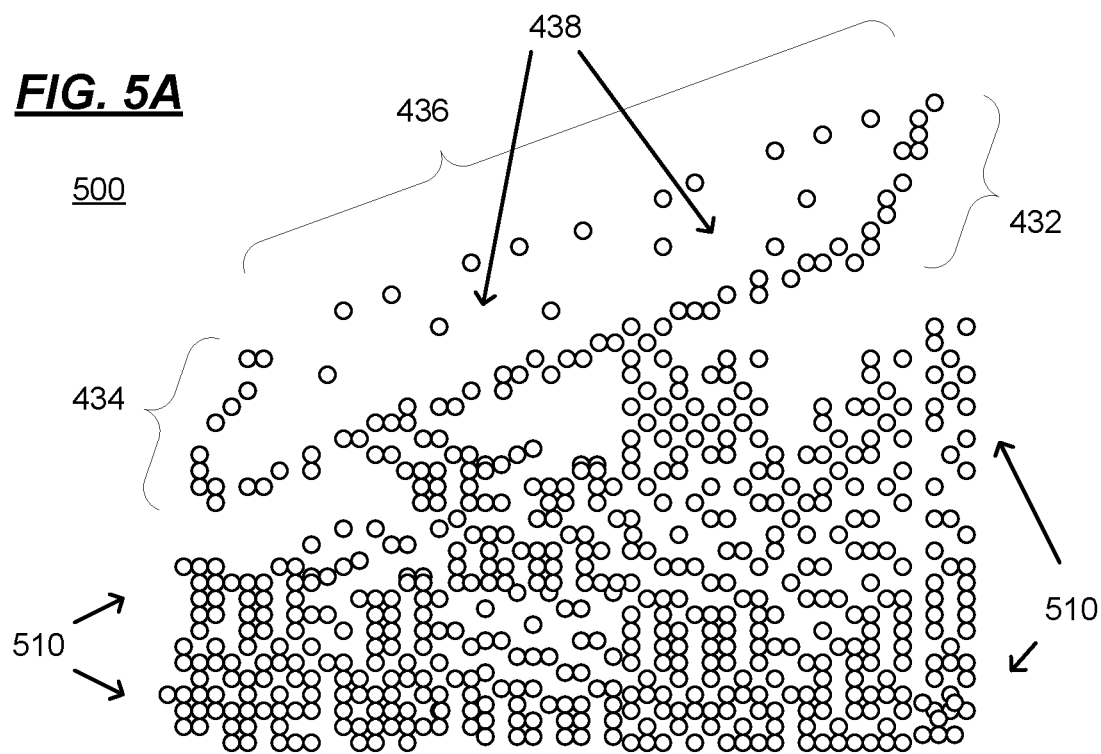
FIG. 5A is an illustration of exemplary detection of objects in an operating site obscured by vegetation growth—in this example, the LIDAR data points corresponding to a solar panel and post and the vegetation obscuring a solar panel post-representative of specific challenges that can be overcome by the various implementations disclosed herein.

FIG. 5A is an illustration 500 of exemplary detection of objects in an operating site obscured by vegetation growth—in this example, the LIDAR data points corresponding to a solar panel and post and the vegetation obscuring a solar panel post—representative of specific challenges that can be overcome by the various implementations disclosed herein. In FIG. 5 the LIDAR 312 data points 410 are similar to those detected in FIG. 4A except for the plethora of additional data points 510 detected beneath the reflective angled components 430, 432, and 434 and the non-reflective surface 438.

Figure 5B:
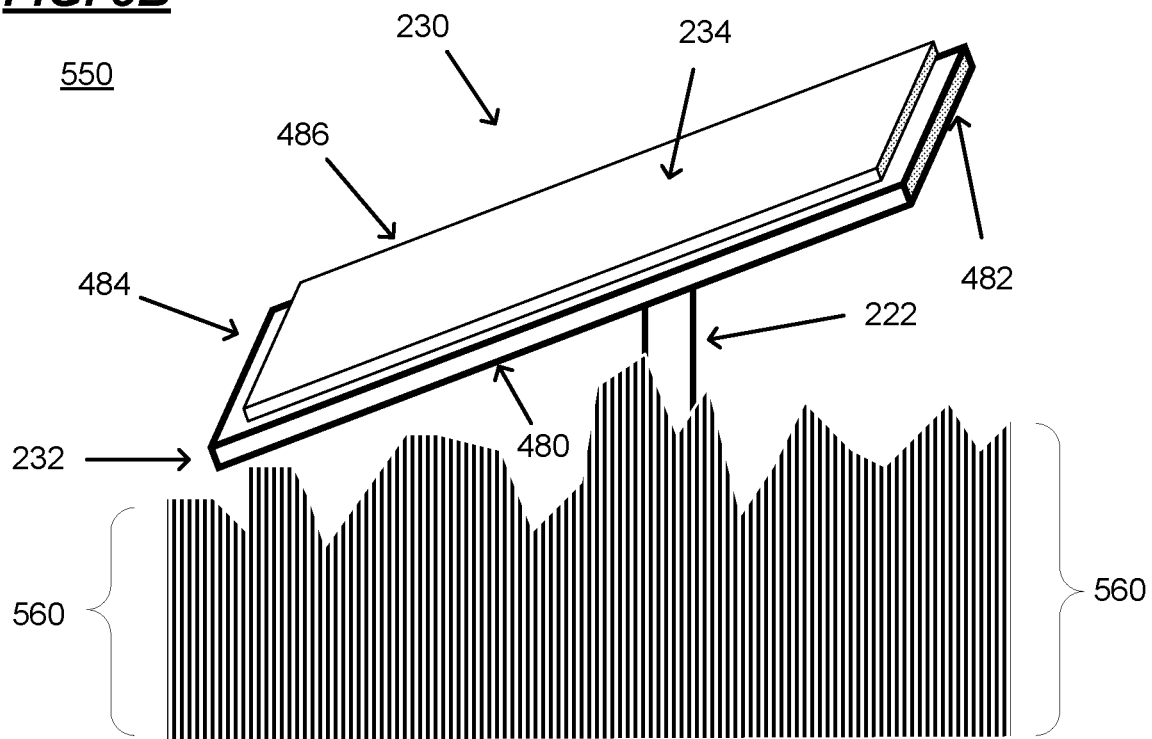
FIG. 5B is an illustration of the solar panel detected in FIG. 5A which can be used to determine the location of the solar panel post that cannot otherwise be directly detected, said determinations being undertaken in a manner representative of the various implementations disclosed herein.

FIG. 5B is an illustration 550 of the solar panel 230 detected in FIG. 5A and which can be used to determine the location of the solar panel post 222 that cannot otherwise be directly detected because of vegetation growth 560 that is obscuring and preventing detection of said post 222 but from which the location of said post 222 can still be determined based on the geometry of the solar panel 230, said determinations being undertaken in a manner representative of the various implementations disclosed herein and discussed in detail elsewhere herein.

Initial Operating Site Setup

Many operating sites could benefit from the utilization of autonomous vehicles such as, for example, large outdoor areas requiring vegetation maintenance or facilities such as solar farms where unchecked vegetation growth can be a hindrance or worse. For these kinds of locations, autonomous vehicles could provide valuable services such as mowing, inspections, and site security to name a few.

However, the initial setup for an autonomous vehicle to navigate and perform tasks on an operating site can be burdensome and time-consuming, often requiring manual programming or deployment of navigational checkpoints devices. This burden increases for sites populated with natural or intentional obstacles to navigation and can be particularly challenging for well-ordered but obstacle-rich environments such as solar farms. Path development is also complicated for operating sites having dynamic obstacles that change their location or orientation from time to time, as well as sites having inherent visibility problems due to rapid growth of vegetation that can obscure obstacles and other hazards.

For these reasons initial path development can discourage the deployment of autonomous vehicles for operating sites that might otherwise significantly benefit from their utilization. As such, there is a need for solutions to the challenges of initial site setup for autonomous vehicle navigation and path development.

For site setup, two types of routes may be utilized: static routes and dynamic routes. Static routes (or, more precisely, static route segments) are those that are fixed in space, akin to lanes on a road, and are used at a site for transiting between locations for performing one or more tasks separate from or in addition to navigation (such as mowing in the context of a autonomous mower). As such, a complete route might include multiple route segments, each of which is static or pre-defined, although other parts of the routes may not be, that is, are more dynamic and thus are typically computed as-needed or real-time to get from point A to point B (somewhat akin to many GPS-based driving maps navigation applications). These dynamic routes (or, more precisely, route segments) are generated for performing the intended tasks and are incorporated into complete route.

For site setup, both types of routes are important but may be created and represented differently. For example, for certain dynamic routes—such as those where the site setup consists of identifying certain features such as rows or polygons that define the area in which the dynamic routes will be generated—these dynamic routes may be developed via any of the various implementation described herein, and for which there may be a clear analog to equivalent manual processes. The creation of the static route segments, however, may be performed differently depending on known features of the site, based on a pre-defined navigational path, or limited to only those locations where pre-defined transit paths may be required for a variety of different reasons (e.g., safety, efficiency, etc.).

For example, in the exemplary context of an autonomous mower, establishing routes at a site typically includes two main tasks: locating and defining mowing areas, and creating transit paths around a site to facilitate movement to and from mowing areas and to and from docking locations. Mowing areas can be defined in a number of ways, including as a polygon boundary, the interior of which is the area to be mowed. The polygons may include other polygons within their boundaries (holes) that are areas that are not be mowed and may correspond to obstacles, untraversable areas, or keep-out zones. The polygons may be further annotated, such as when they represent mowing areas within rows of a solar field (between rows of solar panels), to provide additional guidance on the creation of mowing paths within the rows that result in efficient and consistent patterns.

The primary features of solar sites are the numerous rows of solar panels, and setting up a solar site requires defining mowing areas within all of the rows of panels. Even relatively small sites can have several hundred rows, and mapping each of the rows directly can be impractical, even for an unmanned and autonomous robot. Instead, the regularity, and precise geometric layout of the panels on these sites can be used to identify the location and size of all the rows without measuring all of them directly. For example, by measuring the location of three points in a section of solar panel rows, such as three extreme corners of the section (where each corner might be defined as the point of intersection between the centerline of the panels at the end edge of a row of panels), as well as the row pitch (the distance between neighboring rows), a mow area defined for a single row can be replicated across an entire section. A section could consist of as few as two panels, or have a hundred or more. A similar process can be used to generate transit paths throughout the section as well.

The three-point survey could be performed in an augmented fashion, for example, by placing a high accuracy GPS antenna over each corner location of a solar panel section and recording the corresponding measured location. The same measurements can be obtained from an autonomous vehicle using LIDAR or another sensing modality where each corner point is detected and its location is estimated based on the combined position of the vehicle and the range and bearing of the measurement from the vehicle. To minimize error in the measured location of these survey points, multiple detections and measurements of the same locations can be acquired as the vehicle moves around the site, and those measurements can be combined (e.g. via averaging) to improve the accuracy of the location estimate).

Alternatively, the site setup task need not be performed completely autonomously. In many cases, simple guidance may be provided by a user/operator or other automated source to facilitate quicker and more accurate setup of the site. For example, a user may create an initial route network for a site by drawing paths on images taken from overhead, by outlining panel sections on such overhead imagery, or by defining rough open area polygon mow regions. While these routes and regions will generally not be accurate enough for direct use by the vehicle for normal mowing operations, particularly within the solar panel rows, this initial rough route development is useful for creating paths for the vehicle to travel in order to collect the measurements necessary, such as the three-point surveys, to fully generate and refine the site map. Such guidance also helps to avoid the pitfalls of trying to identify all of the mow areas by blindly exploring the site.

The resulting site map may consist of multiple different features including a route network, rows, and polygons as well as the connectivity between these features. Polygons and rows generally may be areas designated for mowing. Rows existing in and amongst solar panels may imply that the mowing will take place in close proximity to physical infrastructure including solar panels and their supports. Polygons may represent open areas with no permanent obstacles. The route network may be a set of points and connections between the points that can be used for routing/navigation around a side.

Polygon regions may be established where large scale obstacles like fences, buildings and solar panel rows are used to identify the natural boundaries of the site and create polygons to fit those boundaries. Some of these auto site setup tasks/measurements may also be performed by other robotic or autonomous devices such as UAVs/drones.

Disclosed herein are various implementations directed to solutions for enabling an autonomous vehicle to perform initial operating site setup to include obstacle detection, navigational reference point identification, and two-part "travel-and-task" path development. Several such implementations are also directed to autonomous vehicles that can perform the solutions presented herein in whole or in part. Also disclosed are solutions for an autonomous vehicle to perform an initial navigational setup at an operating site by: receiving initial location and orientation data pertaining to the autonomous vehicle; iteratively sensing a plurality of recognizable objects and determining a plurality of fixed reference locations corresponding to each of the plurality of recognizable objects relative to the initial location and orientation data; and developing an operational path plan for the autonomous vehicle to traverse the operating site based on the plurality of fixed reference locations. For select implementations, the autonomous vehicle may be an autonomous mower, the dynamic object may be a solar panel and/or solar panel post, and the sensing may be performed using light detection and ranging (LIDAR).

Figure 6A:
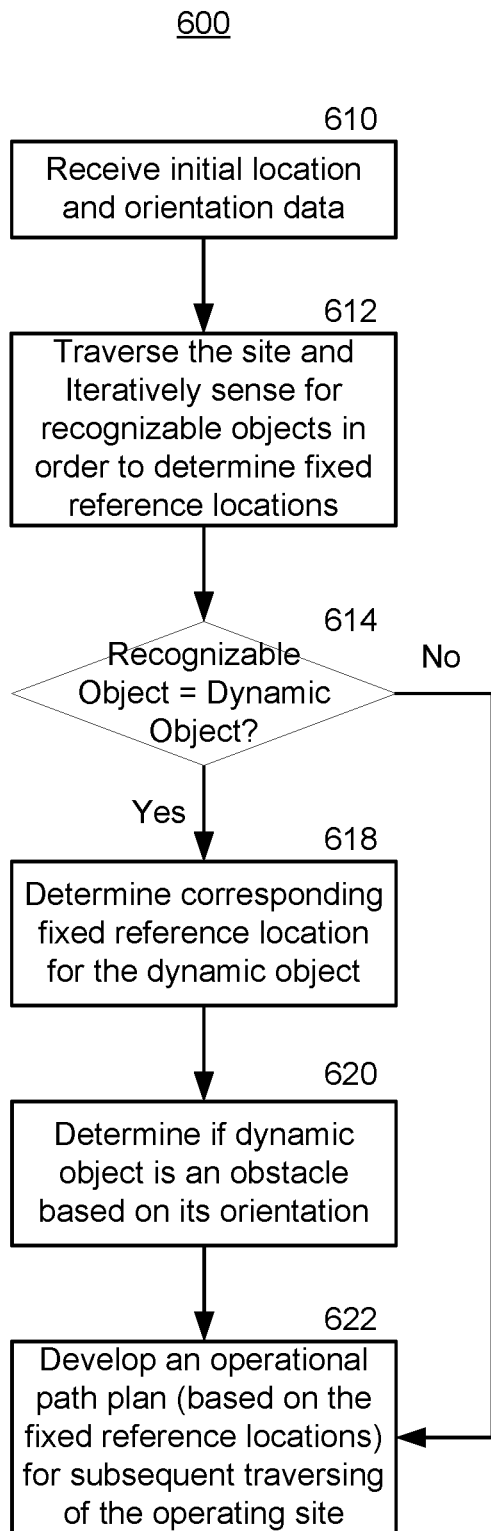
FIG. 6A is a process flow diagram, representative of the various implementations disclosed herein, illustrating an approach by which an autonomous vehicle may perform an initial navigational setup at an operating site and thereby develop an operational path plan for the autonomous vehicle to traverse the operating site based on the plurality of fixed reference locations.

FIG. 6A is a process flow diagram 600, representative of the various implementations disclosed herein, illustrates an approach by which an autonomous vehicle 310 may perform an initial navigational setup at an operating site 110 and thereby develop an operational path plan 140 for the autonomous vehicle 310 to traverse the operating site 110 based on the plurality of fixed reference locations.

Referring to FIG. 6A, at 610 the autonomous vehicle (e.g., an autonomous mower) receives initial location and orientation data pertaining to the autonomous vehicle. Then, at 612, the autonomous vehicles carefully navigates the operational site to iteratively sense a plurality of recognizable objects to determine a plurality of fixed reference locations corresponding to each of the plurality of recognizable objects relative to the initial location and orientation data. At 614, each recognizable object is then assessed to determine if it is a dynamic object in a present location that may not be a fixed location, and if so then at 618 the corresponding fixed reference location corresponding to the dynamic object is determined based its present location and orientation. Notably, this corresponding fixed location for said dynamic object is such that it will always be accurately determined to be at the corresponding fixed location even when the dynamic object is later sensed in a subsequent location and different orientation (akin to how the fixed location for a solar panel post relative to the dynamic location and orientation for the solar panel affixed thereupon). Furthermore, at 620, a further determination is made as to whether the dynamic object in the present orientation at the present location constitutes an obstacle to the autonomous vehicle and, if so, cause the autonomous vehicle to avoid said obstacle while the dynamic object while in its present orientation. Finally, at 622, an operational path plan is developed for the autonomous vehicle to traverse the operating site based on the plurality of fixed reference locations at a later time, and enabling the autonomous vehicle to do so even if GPS location data is not available by simply determining, via its on-board sensors, its location relative to the known fixed reference locations as it traverses the operating site.

For various implementation herein disclosed, an autonomous vehicle may perform an initial navigational setup at an operating site by receiving initial location and orientation data pertaining to the autonomous vehicle (e.g., an autonomous mower), iteratively sensing a plurality of recognizable objects (e.g., solar panel posts), and determining a plurality of fixed reference locations (e.g., GPS coordinates) corresponding to each of the plurality of recognizable objects relative to the initial location and orientation data, and developing an operational path plan for the autonomous vehicle to traverse the operating site based on the plurality of fixed reference locations. The operation path plan may comprise, for example, a two-part "travel-and-task" path comprising sub-paths for travel only and other sub-paths for task performance while still or while navigating. The autonomous vehicle may also detect natural boundaries for the operating site within which to operate, may calculate its own operational boundary based on (and relative to) a determinable perimeter for the outermost recognizable objects. The autonomous vehicle may also detect non-recognizable objects, some having fixed locations (e.g., rock piles, buildings, fences, etc.) and some not so fixed to their detected location (vehicles, people, animals, other autonomous vehicles) which may or may not provide additional information for inclusion (if not at least consideration) in the development of the operational path plan. Notably, these unrecognizable objects are not dynamic objects (described below) but instead are simply obstacles and/or additional reference points.

Of course, it will be well-understood and readily appreciated by skilled artisans that a recognizable object may be a dynamic object capable of changing its location, and thus determining a fixed reference location corresponding to such dynamic objects may be achieved by first determining that the at least one recognizable object is a dynamic object in a present location that may not be a fixed location, and then determining a present location for the dynamic object and determining a corresponding fixed reference location corresponding to the dynamic object where the corresponding fixed reference location is one that can consistently determinable for the dynamic object even when the dynamic object is subsequently detected to be in a different location compared to the present location—in other words, where the corresponding fixed reference location is consistent and determinable based on the detected location of the dynamic object plus some other information such as the orientation of the dynamic object.

For example, the detected location and orientation of a solar panel can be used to mathematically determine a single fixed location that just happens to correspond to the same location as the corresponding solar panel post upon which the solar panel is affixed. As previously discussed, this determinable relationship is very helpful not only in determining a corresponding fixed location for the solar panel itself for navigation purposes, but it also enables for the detection and location of solar panel posts that might otherwise not be detectable by the autonomous vehicle using its on-board sensors (e.g., due to high vegetation, fog, etc.).

In any event, while a dynamic object may be able to change its location by changing its orientation relative to the corresponding fixed reference location, the unique feature of a dynamic object is the ability for an autonomous vehicle to consistently determine a corresponding fixed reference location corresponding for the dynamic object based on its present location and some other detectable feature such as its present orientation, the combination of which lends itself to a mathematical determination of the corresponding fixed reference location.

Moreover, regarding orientation, dynamic objects may sometimes constitute an obstacle when in one orientation but not in another orientation, and this can also be determined mathematically by determining if the dynamic object in its present orientation at its present location constitutes an obstacle—for example, by determining if the lowest point of the dynamic object would obstruct navigation by the autonomous vehicle—and if so causing the autonomous vehicle to avoid said dynamic object while the latter is in its present orientation (i.e., until the dynamic object is no longer in an orientation that would obstruct travel of the autonomous vehicle).

As for developing an operational path plan for the autonomous vehicle to traverse the operating site based at least in part on the plurality of fixed reference locations, various implementations may determine at least one travel-only sub-path for the autonomous vehicle to traverse to position the autonomous vehicle for performing at least one task, and then determine at least one task-specific sub-path for the autonomous vehicle to traverse while performing the at least one task. Regardless, for certain implementations developing the operational path plan for the autonomous vehicle to traverse the operating site based at least in part on the plurality of fixed reference locations may comprises: determining a reference pattern corresponding to the plurality of fixed reference locations; defining an operational boundary for the operational site based at least in part on the reference pattern; and navigating the autonomous vehicle within the operational boundary and within a desired proximity to at least a subset of objects from among the plurality of recognizable objects.

As for the operational path plan, and for numerous implementations herein disclosed, the autonomous vehicle would be capable of utilizing the operational path plan to navigate the operational site at a future time by re-sensing a subset of the plurality of recognizable objects to produce navigation reference data, determining a current position and a current orientation for the autonomous vehicle based on the navigation reference data, and then traversing the operational site according to the operational path relative to the current position and current orientation.

Accordingly, disclosed are solutions for an autonomous vehicle to perform an initial navigational setup at an operating site by: receiving initial location and orientation data pertaining to the autonomous vehicle; iteratively sensing a plurality of recognizable objects and determining a plurality of fixed reference locations corresponding to each of the plurality of recognizable objects relative to the initial location and orientation data; and developing an operational path plan for the autonomous vehicle to traverse the operating site based on the plurality of fixed reference locations. The autonomous vehicle may be an autonomous mower, the dynamic object may be a solar panel and/or solar panel post, and the sensing may be performed using light detection and ranging (LIDAR). However, the broad and diverse applications of the various implementations disclosed herein are in no way limited to the specific examples described but, instead, should be understand to apply to any autonomous vehicle and operating site without any limitations.

Terrain Prediction and Detection

Various implementations disclosed herein are directed to proactively sensing the condition of the ground in the path of the autonomous vehicle in to order mitigate the risks of an autonomous vehicle encountering troublesome terrain, navigation obstacles, and other potential risks to the continued uninterrupted operation of said autonomous vehicle. Accordingly, various implementations disclosed herein are directed to the use of ground analysis sensors to assist in the detection of navigationally-difficult terrain including, for example, the use of cantilevered sensors operating well in front of the autonomous vehicles front wheels (drive wheels or otherwise).

For example, for the several implementations disclosed herein, the autonomous vehicle may be an autonomous mower utilizing a cantilevered deck (or substantially cantilevered deck when low-contact ride wheel are still present) which provide an in-front floating platform comprising special forward sensors positioned well in front of the forward wheels (e.g., the drive wheels) of the autonomous mower's tractor—if not on the leading edge of the cantilevered deck itself—said forward-placed sensors providing ground analysis helpful to the autonomous mower in avoiding troublesome terrain.

For certain such implementations, the forward-place sensors may include drop sensors integrated with low-contact ride wheels integrated into the mower's (substantially) cantilevered deck where the ride wheels would allow the autonomous vehicle to sense negative obstacles such as ground holes or other drastic drops in the terrain ahead. These sensors enable detection of obstacles by changes in weight or pressure borne by each said wheel. This approach may also be utilized in certain alternative implementations that lack a cantilevered deck—such as where the deck is substantially supported by the ride wheels—where a drop in one or both ride wheels can be detected and thereby enable the autonomous vehicle to take appropriate actions to avoid the detected obstacle.

Several such implementations may also comprise strain gauges integrated in the tilt actuators of the mower deck to allow the autonomous vehicle to sense positive elevation changes in the terrain ahead of the vehicle. For other such implementations, non-contact sensors might also provide information on the condition of the terrain around the vehicle—detecting both positive and negative obstacles—said non-contact sensors including but not limited to sensors such as cameras, LIDAR, radar, ultrasonic sensing, ground penetrating radar (GPR), and so forth.

Drop wheel sensors, strain gauges, and other such detectors such as bump bars, tractions slips, and so forth without limitation could also be utilized elsewhere on the autonomous vehicle in similar fashion as will be readily-appreciated and well-understood by skilled artisans. For example, for the several implementations disclosed herein where the autonomous vehicle may be an autonomous mower, drop wheel sensors might be integrated with the rear wheels of the autonomous mower (drive wheels or otherwise) to detect ground drops that might not have been detected by wheels located farther forward—for example, when forward-located drive wheels execute a zero-radius turn causing the rear wheels to roll over ground that the front drive wheels did not—and again enable the autonomous vehicle to detect and avoid troublesome terrain.

Figure 6B:
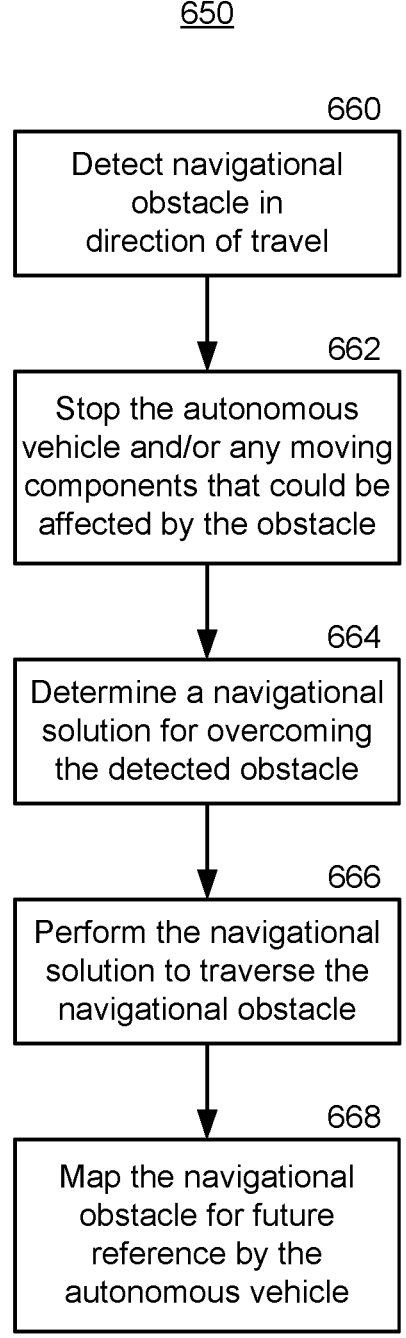
FIG. 6B is a process flow diagram illustrating an approach by which an autonomous vehicle may navigate over terrain having ground-based navigational obstacles representative of the various implementations disclosed herein.

FIG. 6B is a process flow diagram 650 illustrating an approach by which an autonomous vehicle may navigate over terrain having ground-based navigational obstacles representative of the various implementations disclosed herein.

In FIG. 6B at 660 the autonomous vehicle detects a navigational obstacle in the direction of travel, be that in the forward direction, backward direction, rotational direction (e.g., for a zero-radius turn) relative to the autonomous vehicle. This direction of travel may be defined by a path plan, a site exploration algorithm, or for other purposes. After a navigational obstacle is detected, at 662 the autonomous vehicle may stop travel and may also discontinue any operations having moving components that could be affected by the navigational obstacle such as, for example, underside mower blade rotation. At 664 the autonomous vehicle might then determine a navigational solution for overcoming the detected obstacle and then, at 666, perform the determined solution. For example, for implementations where the autonomous vehicle is an autonomous mower comprising a raise-able cantilevered mover deck (such as illustrated in FIGS. 7A, 7B, and 7C described in detail later herein), the autonomous mower may raise the mower deck, back away from the detected navigational obstacle, and then navigate around the detected navigational obstacle. These elements can then be repeated iteratively to similarly overcome subsequent navigational obstacles when detected (not shown). In addition, the autonomous vehicle may map the navigational obstacle for future reference which, for some implementations, my include updating the navigational path plan utilized by the autonomous vehicle.

Based on this approach and the various variations thereof that would be readily apparent and well understood by skilled artisans, several implementations disclosed herein are directed to an autonomous vehicle to navigate over terrain by detecting a ground-based navigational obstacle in the direction of travel of the autonomous vehicle, determining a navigational solution for overcoming the detected navigational obstacle, performing the navigational solution to traverse the navigational obstacle and, for certain implementations, mapping the navigational obstacle for future reference by the autonomous mower. For several exemplary implementations the detecting may performed by a sensor that is, or that is located on, a cantilever of the autonomous vehicle that is forward of the autonomous vehicle relative to the direction of travel. For some implementations, the autonomous vehicle may be an autonomous mower the cantilever may be a cantilevered mowing deck.

For several implementations, the autonomous vehicle may be capable of elevating the cantilever and the navigational solution may comprise elevating the cantilever. Moreover, for select implementations: the detector may comprise a drop sensor for detecting a negative obstacle, and that drop sensor may comprises a ride wheel; and the detector may comprise a strain gauge, a bump bar, or other similar sensor for detecting a positive obstacle.

Exemplary Systems and Component Technologies

An autonomous mower is one example of an autonomous vehicle and which may comprise a mowing deck and a tractor. The tractor may also include a main body that houses various electrical components and electronics such as batteries, drive motors, a battery- or power-management system, component controllers, sensors (e.g., LIDAR, RADAR, IMU, inertial navigation systems, temperature sensors, humidity sensors, noise sensors, accelerometers, pressure sensors, GPS, ultrasonic sensors, cameras or other sensors), network interface devices, a computer system to provide overall control of the mower, and/or other components.

A mowing deck (or "mowing platform") may include one or more blades disposed below the mowing deck. The mowing deck may supported by a number of wheels. For certain implementations, the mowing deck may be cantilevered from tractor without supporting wheels. Power may be provided through electrical connections to motors on mowing deck to drive the mower blades.

A mowing deck may be adapted to provide for low-profile mowing that can pass under solar panels, even when the solar panels are positioned close to the ground and the tractor cannot drive under them. For example, a mowing deck may be disposed forward of tractor and outside of the wheels of a tractor, and thus the tractor can drive the mowing deck into spaces which the tractor cannot go such as under panels that are lower to the ground than the top of the tractor. The form factor of the mowing deck may be selected to achieve a desired cutting width and low profile. A mowing deck may also be otherwise configured to have a larger or smaller width, to work in different clearances, and to have different mowing heights. For several implementations, a mowing deck may be raised and lowered and, in addition or in the alternative, a mowing deck may be tilted up and down.

Figure 7A:
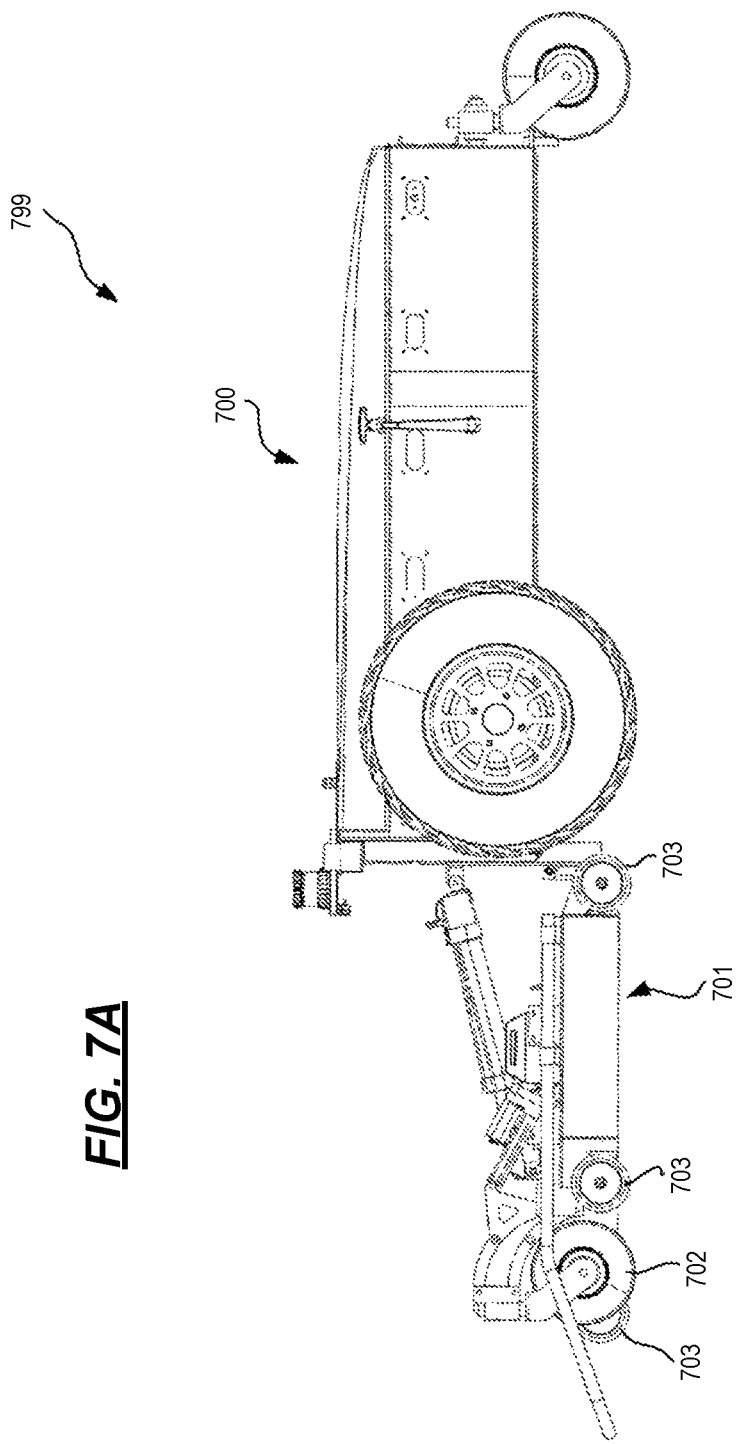
FIG. 7A is a first diagrammatic illustration of an autonomous mower-specifically, a side of view of a autonomous mower 799 that comprises tractor 700 and a mowing deck 701—as an exemplary implementation of an autonomous vehicle representative of the various implementations disclosed herein.

FIG. 7A is a first diagrammatic illustration of an autonomous mower—specifically, a side of view of a autonomous mower 799 that comprises a tractor 700 and a mowing deck 701—as an exemplary implementation of an autonomous vehicle representative of the various implementations disclosed herein.

Figure 7B:
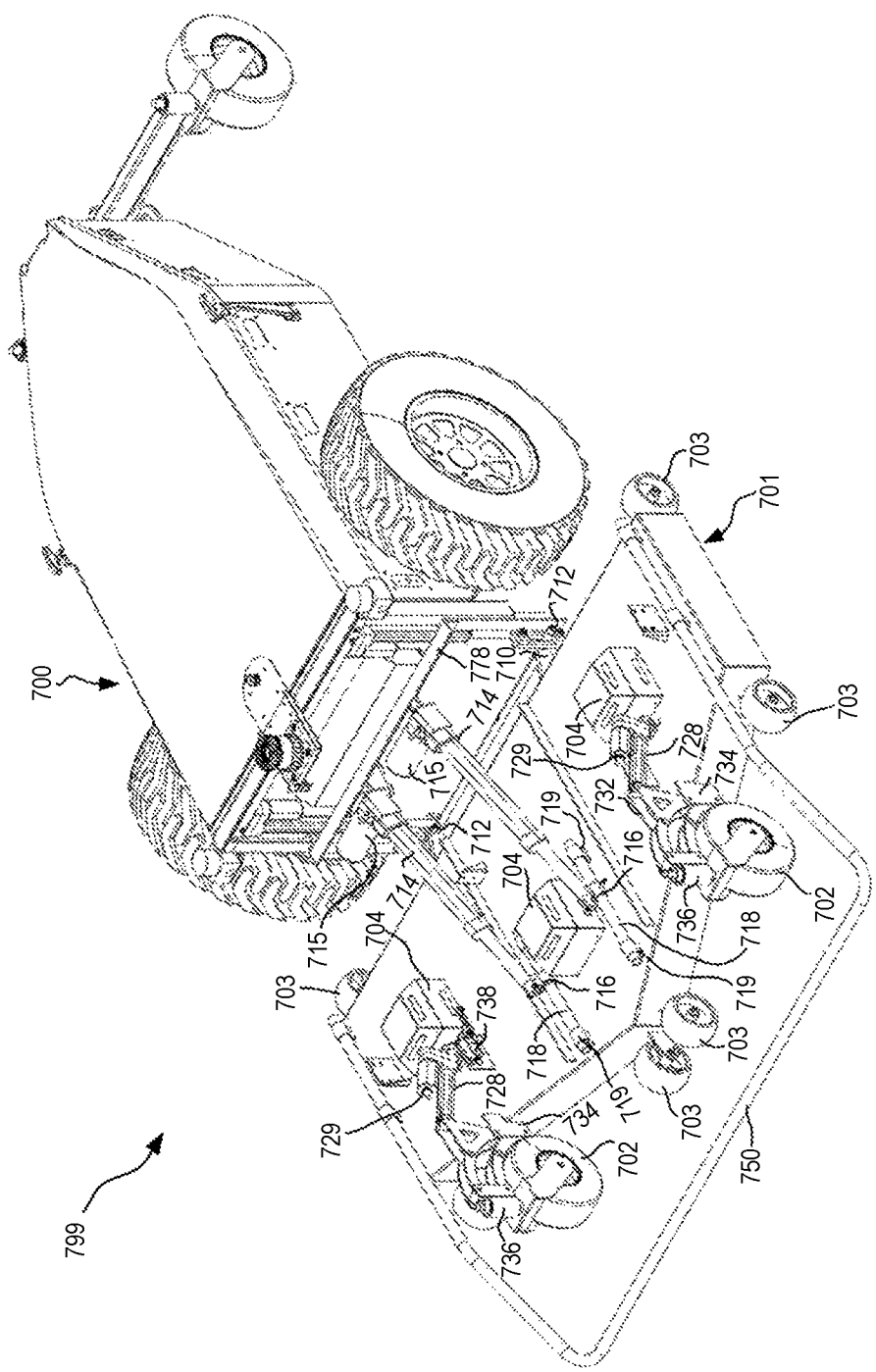
FIG. 7B is a second diagrammatic illustration of the autonomous mower of FIG. 7A-specifically, an oblique front view of a autonomous mower 799 that comprises tractor 700 and a mowing deck 701—as an exemplary implementation of an autonomous vehicle representative of the various implementations disclosed herein.

FIG. 7B is a second diagrammatic illustration of the autonomous mower of FIG. 7A—specifically, an oblique front view of a autonomous mower 799 that comprises tractor 700 and a mowing deck 701—as an exemplary implementation of an autonomous vehicle representative of the various implementations disclosed herein.

Figure 7C:
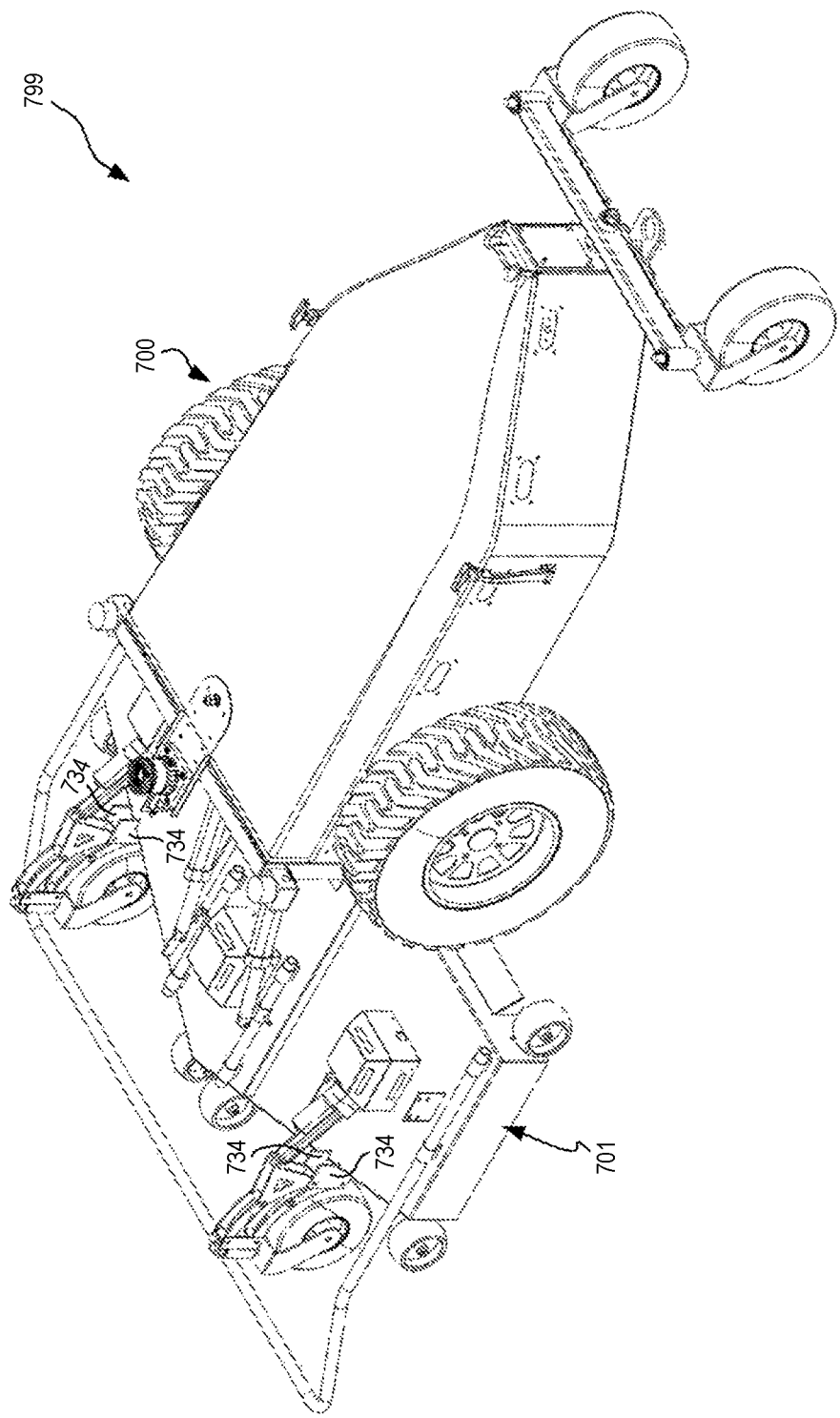
FIG. 7C is a third diagrammatic illustration of an autonomous mower of FIGS. 7A and 7B-specifically, an oblique rear view of a autonomous mower 799 that comprises tractor 700 and a mowing deck 701—as an exemplary implementation of an autonomous vehicle representative of the various implementations disclosed herein.

FIG. 7C is a third diagrammatic illustration of an autonomous mower of FIGS. 7A and 7B—specifically, an oblique rear view of a autonomous mower 799 that comprises tractor 700 and a mowing deck 701—as an exemplary implementation of an autonomous vehicle representative of the various implementations disclosed herein.

In FIGS. 7A, 7B, and 7C—which may be referred to collectively hereinafter as "FIG. 7" for convenience—autonomous mower 799 may include one or more blades disposed below a mowing deck 701. The mowing deck may be supported by a number of wheels including contact wheels 702 which can be moved to maintain contact with the ground and other wheels 703. Power may be provided through electrical connections to motors 704 on mowing deck 701 to drive the mower blades.

Mowing deck 701 may be adapted to provide for low-profile mowing that can pass under solar panels, even when the solar panels are positioned close to the ground and the tractor cannot drive under them. Mowing deck 701 may be disposed forward of tractor 700 and outside of the wheels of tractor 700, and thus tractor 700 might drive the mowing deck 701 into spaces which tractor 700 itself cannot go, such as under panels that are lower to the ground than the top of tractor 700. The form factor of the mowing deck may be selected to achieve a desired cutting width and low profile. Mowing deck 701 may be otherwise configured to have a larger or smaller width, to work in different clearances and to have different mowing heights.

The rear of mowing deck 701 may be mounted to tool mounting bracket 770 using a hinged connection such that the front of mowing deck 701 can be tilted up. For example, mowing deck 701 may include rearwardly extending hinge members 710. Hinge pins 712 may extend laterally from hinge members 710 to pass through the respective hinge pin openings 783. Hinge pins 712 may comprise bolts that pass-through hinge members 710 and side plates 782. The hinge pins 712 may define an axis of rotation for tilting mowing deck 701 relative to tractor 700.

Additionally, mowing deck 701 may be coupled to tool mounting bracket 770 by tilt actuators 714, which are linear actuators driven by electric motors 715. A first end of each tilt actuator 714 may be rotatably coupled to tool mounting bracket 770 at attachment points 779. The second end of each tilt actuator 714 (e.g., the end of the drive tube) may be connected to the top of mowing deck 701 by a slidable connection or other connection that allows translation. More particularly, guiderails 718 may be attached to and spaced from the top surface of mowing deck 701 (e.g., by standoffs 719) and the second end of each tilt actuator may be coupled, at a rotatable connection, to a sleeve 716 that is translatable along the respective guiderail 718. Biasing members, such as springs disposed about the guiderails 718, may be provided to bias the sleeves 716 forward or rearward.

Autonomous mower 799 thus may include a lift and tilt mowing deck 701. Retracting and extending lift actuators 784 may lift and lower tool mounting bracket 770 and hence mowing deck 701. Retracting tilt actuators 714 may tilt the front end of mowing deck 701 up and extending tilt actuators 714 may lower the front end of mowing deck 701. As discussed above, the capability to lift/tilt the mowing surface may provide a mobile automated maintenance system the enhanced capability to adapt to different contours of the ground and thereby may provide the advantage of level cutting of vegetation by the mowing system. Moreover, the capability to tilt the mowing deck 701 may increase the ease of maintenance and may provide an operator easy access to replace or maintain the mowing blades.

Mowing deck 701 may also include contact wheels 702 that may be operationally coupled to contact wheel actuators 728 (e.g., by linkages 732). Contact wheel actuators 728, which may be linear actuators driven by electric motors 729, may be actuated to maintain contact between contact wheels 702 and the ground and in some cases to maintain a desired amount of deck front pressure (e.g. pressure between wheels 702 and the ground). Moving wheels to maintain a desired amount of contact may allow mowing deck 701 to better follow the contour of the ground or to allow wheels 702 to continue to provide support at the front portion of mowing deck 701 when mowing deck 701 is lifted by lift actuators 784. Moreover, maintaining pressure on contact wheels 702 may be used to help regulate the traction of drive wheels 756 and, as discussed earlier herein, to sense anomalies in the ground that could be obstacles to navigation representative of various implementations herein disclosed.

In addition, a first end of each contact wheel actuator 728 may be rotatably coupled to the top of mowing deck 701. The second end of each contact wheel actuator 728 (e.g., the end of the drive tube, in the illustrated embodiment) may be rotatably coupled to a respective linkage 732. A first end of each linkage may be rotatably coupled to the front of mowing deck 701. The end of each linkage 732 may then capture a pin or other member disposed between a respective pair of forwardly extending plates 734. The distal end of each linkage 732 may include a collar 736 with an internal bushing to receive the shank of a respective contact wheel caster. Extending contact wheel actuators 728 may cause the respective linkages 732 to rotate, pushing the respective contact wheels 702 down. Retracting contact wheel actuators 728 may cause the respective linkages 732 to rotate and pull the respective contact wheels 702 up relative to mowing deck 701.

Mowing deck 701 may include a variety of sensors, such as sensors 738 to measure the frontside pressure at contact wheels 702 (one sensor 738 is visible in FIG. 7B, but a similar sensor can be provided for the other contact wheel). Rotary sensors may be used to output an indication of an amount of contact, and other sensors may also be used. The output of sensors 738 may be used for active control of mowing deck and provide information about the terrain usable in future control decisions.

Mowing deck 701 may include a bump bar 750 which may incorporate a sensor to indicate that autonomous mower 799 has run into an obstacle. Bump bar 750 may also incorporate a kill switch such that autonomous mower 799 will stop the blades, stop moving, shut down, or take other action in response to bump bar 750 bumping into an obstacle with a threshold amount of force. The various motors and sensors associated with mowing deck 701 may be electrically connected to controllers in main body 752.

Notably the mowing deck may be cantilevered (or substantially cantilevered) instead of or in addition to being minimally supported by contact wheels 702 or other deck wheels 703, in which case the contact wheels 702 might be utilized primarily for sensing holes, edges, and other obstacles in accordance with the various implementations disclosed herein.

For certain implementations, mowing deck 702 can connect to tractor 701 using a tool mounting bracket such as tool mounting bracket 770 that may be slidably coupled to the tractor 701. Mowing system 700 may also include lift actuators 784 to lift the mowing deck 702 and tilt actuators 714 to tilt the mowing deck 702. It can be noted then the lift and tilt actuators can be independently controlled to provide increased control over the pitch (rotation about a lateral (side-to-side) axis) and roll (rotation about a longitudinal (front-to-rear) axis) of the mowing deck and the robot can be controlled to control the yaw (rotation about the vertical axis) of the mowing deck. It can be further noted that in some embodiments, all the motors, actuators in a robot or automated maintenance system may be electrical thus eliminating the possibility of hydraulic oil leaks that is present if hydraulic actuators are used.

Figure 8:
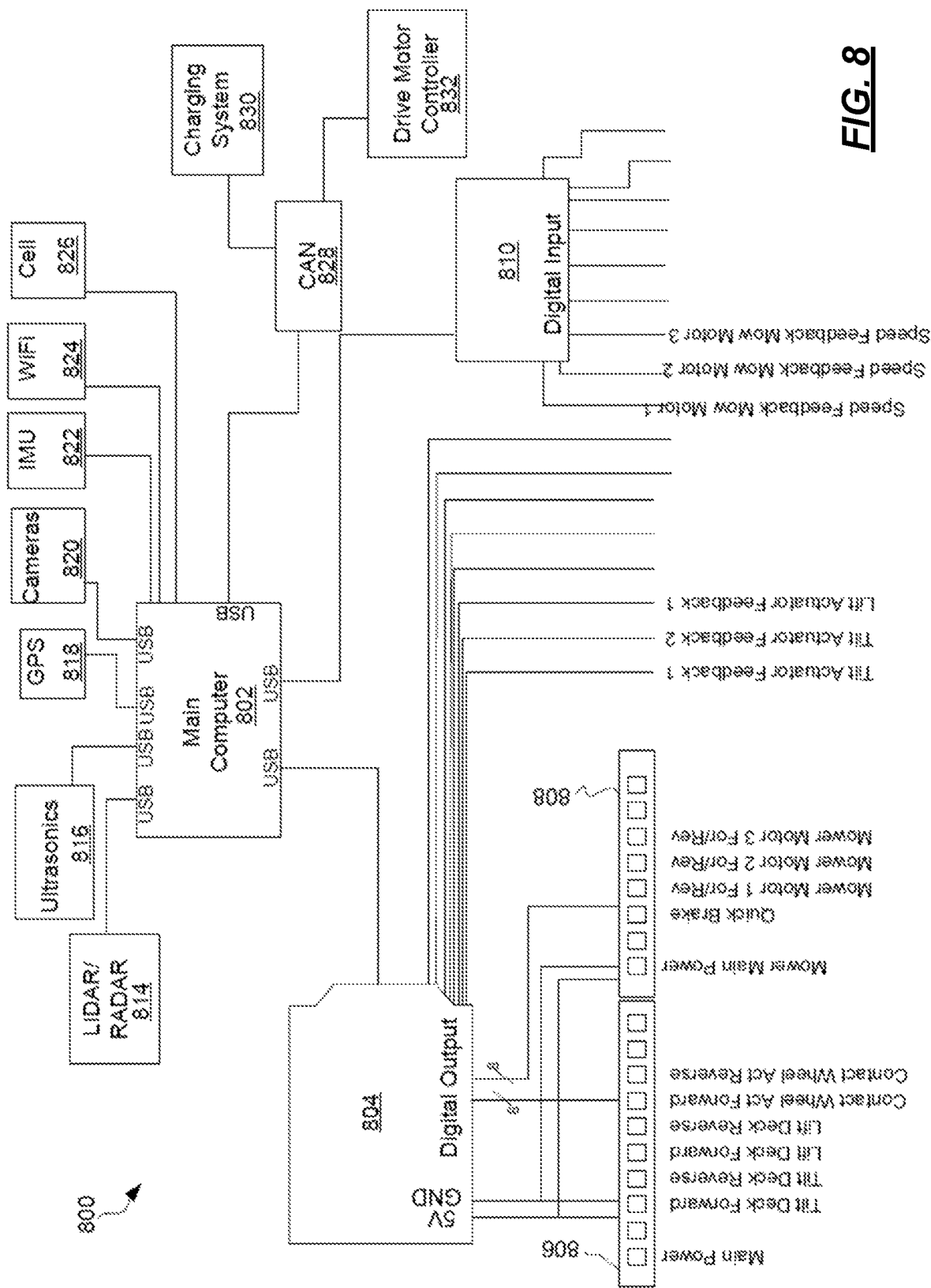
FIG. 8 is a diagrammatic illustration of an exemplary control system for an autonomous vehicle such as, for example, the autonomous mower illustrated in FIGS. 7A, 7B, and 7C and representative of the various implementations disclosed herein.

FIG. 8 is a diagrammatic illustration of an explanatory control system for an autonomous vehicle such as, for example, the autonomous mower illustrated in FIG. 7 and representative of the various implementations disclosed herein. More specifically, FIG. 8 is a diagrammatic representation of certain implementations of a control system for an autonomous mower such as autonomous mower 310. Components of FIG. 8 may be housed in an autonomous, unmanned vehicle, such as a tractor. Control system 800 may include a main computer 802 to provide overall control of the tractor or other autonomous vehicle. For select implementations, main computer 802 may be a computer system adapted for expected operating conditions of the autonomous vehicle. By way of example but not limitation, main computer 802 may be a fan-less embedded system suited for industrial applications, and/or main computer 802 may include software and hardware to implement a state machine comprising, for example, autonomy, halt-and-wait capabilities, and remote-control states, as well as control autonomous navigation, maintenance operation functionality, and other functionality described, disclosed, or otherwise suggested herein.

In the specific implementation illustrated in FIG. 8, main computer 802 may be connected to various controllers that control the distribution of power to and receive feedback from various components. Main computer 802 may also be connected to a first controller 804 by a bus, such as a USB or other bus architecture. First controller 804 may control the distribution of power to various components as needed, for example, first controller 804 may control logic relays 806 to provision main power for drive motor controller 832, control power to drive motor controller 832, and forward or reverse power to tilt actuator motors, lift actuator motors, and wheel actuator motors. Via relays 808, first controller 804 may control distribution of power to the motor controllers of the mower motors that turn the mower's blades. In this example, each mower motor controller may have a main power input, an enable control signal input (e.g., high level/stop low level/run), a quick brake input (e.g., high level/stop, low/level run), a forward/reverse (F/R) input, and/or other inputs. First controller 804 may also control the signals to these inputs to start/stop and otherwise control power to the mower motors as needed.

First controller 804 may also receive feedback from various components. For example, lift actuators, tilt actuators, and wheel actuators may incorporate Hall Effect sensors or other sensors to provide feedback indicative of position, movement, or other related information. Moreover, first controller 804 can receive feedback from wheel pressure sensors. First controller 804 can provide data based on the feedback to main computer 802 indicative of, for example, speed, position or other condition of the actuators or contact wheels.

Main computer 802 may be further connected to second controller 810 via a communications bus such as a USB bus. Second controller 810 may receive feedback from various components of the attached tool. In this example, second controller 810 may connect to speed feedback outputs and alarm outputs of the mower motor controllers. For some implementations, second controller 810 may also provide hardware monitoring of various components of the attached tool and main computer 802 can provide software monitoring. Main computer 802 may be connected to various other components of the autonomous vehicle.

Additionally, one or more sensor components may be connected to main computer 802 over a communications bus. For example, main computer 802 may be connected to a LIDAR and/or RADAR unit 814, ultrasonic sensors 816, GPS 818, cameras 820 and an IMU 822. Main computer 802 may also be connected to (or include) various network interfaces. For example, main computer 802 may be connected to a Wi-Fi adapter 824 and a cellular network adapter 826. In the specific implementation illustrated in FIG. 8, the communications bus is a USB bus, although any suitable communications bus may be used. Furthermore, as illustrated in FIG. 8, main computer 802 may be connected to one or more components of a charging system 830 and a drive motor controller 832 by a controller area network (CAN) 828 or other connection. Main computer 802 can, for example, communicate with drive motor control to control drive motors to turn the drive wheels and battery management system to receive data regarding battery status and control charging and discharging of batteries.

Control system 800 is provided by way of example and not intended to limit the disclosures and implementations described herein in any way. For some implementations, the control system 800 of an autonomous vehicle, such as a tractor 710 or other mobile automated or autonomous system, can be reconfigured for a particular type of tool. For example, for a cantilever mowing deck there would not be a connection for (or the connection would not be used) for the deck wheel actuators, nor would connections for deck wheel actuator feedback be used. For certain implementations, control system 800 could be reconfigured as needed to provide appropriate controllers and/or software configuration of main computer 802.

Figure 9:
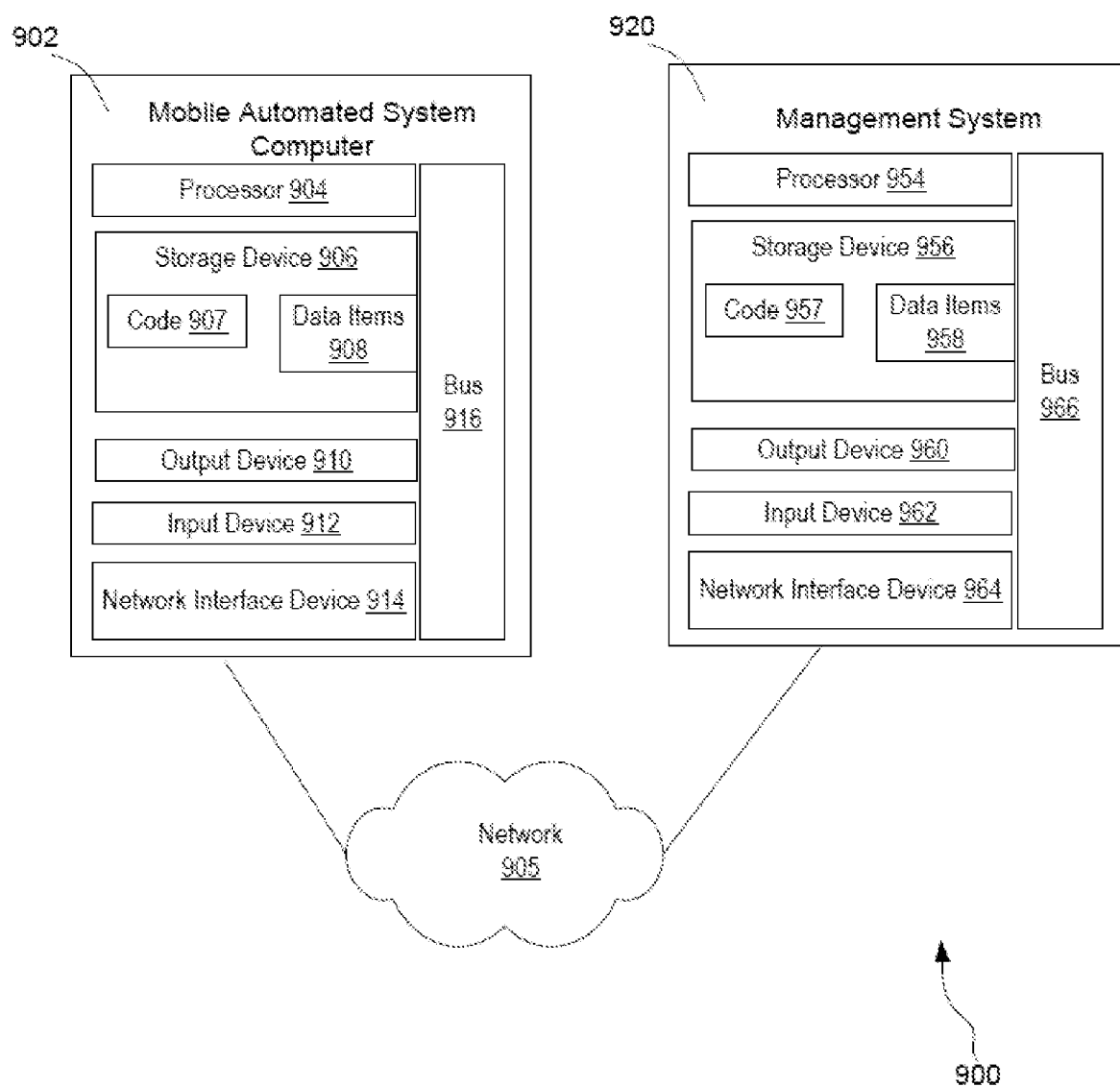
FIG. 9 is a block diagram illustrating an exemplary network system representative of the various implementations disclosed herein.

FIG. 9 is a block diagram illustrating an exemplary network system representative of the various implementations disclosed herein. More specifically, FIG. 9 is a diagrammatic representation of various implementations of a maintenance network system 900 comprising a computer 902 communicatively coupled to a central management system 920 via a network 905. Computer 902 may be one example of a computer for controlling a robot including a robot that provides a mobile automated maintenance system. Computer 902 may be one instance of a main computer 802 of an autonomous mower. Central management system 920 also may be one instance of management system 106.

Computer 902 may include a processor 904, a storage device 906, an output device 910, an input device 912, and a network interface device 914 connected via a bus 916. Processor 904 may represent a central processing unit of any type of processing architecture, such as CISC (Complex Instruction Set Computing), RISC (Reduced Instruction Set Computer), VLIW (Very Long Instruction Word), a hybrid architecture, or a parallel architecture in which any appropriate processor may be used. Processor 904 executes instructions and may include that portion of the computer that controls the operation of the entire computer. Processor 904 may also include a control unit that organizes data and program storage in memory and transfers data and other information between the various parts of the computer. The processor receives input data from the input device 912 and the network, reads and stores code and data in the storage device 906 and outputs data to the output devices 910.

Although a single processor, input device, storage device output device, and single bus are illustrated in FIG. 9, computer 902 may have multiple processors, input devices, storage devices, output devices and busses with some or all performing different functions in different ways. Furthermore, storage device 906 may represent one or more mechanisms for storing data. For example, storage device 906 may include read-only memory (ROM), random access memory (RAM), magnetic disk storage media, optical storage media, flash memory devices, solid state device storage media, and/or other machine-readable media, both non-transitory and transitory in nature. In other implementations, any appropriate type of storage device may be used, and/or multiple types of storage devices may be present. Additionally, multiple and different storage devices and types may be used in conjunction with each other to perform data storage functions for the computer. Furthermore, although the computer is illustrated in FIG. 9 as containing the storage device, the storage device may be distributed across other computers communicatively coupled over a suitable network such as, for example, on a remote server.

Storage device stores code 907 and data items 908 therein. Code 907 may be capable of storing instructions executable by processor 904 to carry out various functions described herein including but not limited to autonomous navigation and other functions. In some implementations, code 907 may be executable to implement a command center application. In other implementations, code 907 may be executable to implement a mow pattern planner. In some implementations, code 957 may be executable to implement a path generator. In some implementations, code 957 may be executable to implement a route generator. In some implementations, code 907 may be executable to implement a state machine having, for example, an autonomy state, a hold-and-wait state, and a remote-control state. In other implementations, some or all of the functions may be carried out via hardware in lieu of a processor-based system.

As will be understood by those of ordinary skill in the art, the storage device may also contain additional software and data (not shown). Indeed, data items 908 may include a wide variety of data including but not limited to configuration data, data collected by the autonomous vehicle during use, data provided to the autonomous vehicle by the central management system 920 or other system, maintenance plans, path information, and other data. Although the code 907 and the data items 908 as shown to be within the storage device 906 in the computer 902, some or all of them may be distributed across other systems communicatively coupled over the network, for example on a server.

Output device 910 represents devices that may output data to a user or direct data to be sent to other systems connected through the network. The output may be a liquid crystal display (LCD), in one example, though any suitable display device may be used. For certain implementations, an output device displays a user interface. Any number of output devices can be included, including output devices intended to cause data to be sent to other systems connected through network 905. Input device 912 may represent one or more devices that provide data to processor 904, and input device 912 may represent user input devices (e.g., keyboards, trackballs, keypads and the like), sensors, or other input devices.

The network interface device 914 may provide connection between the computer 902 and network 905 through any suitable communications protocol. The network interface device 914 sends and receives data items from the network. Bus 916 may represent one or more busses, e.g., USB (Universal Serial Bus), PCI (Peripheral Component Interconnect), ISA (Industry Standard Architecture), X-Bus, EISA (Extended Industry Standard Architecture), MCA (Micro Charnel Architecture), IEEE 994, or any other appropriate bus and/or bridge.

Computer 902 may be implemented using any suitable hardware and/or software. Peripheral devices such as auto adapters or chip programming devices, such as EPROM (Erasable Programmable Read-Only Memory) programming devices may be used in addition to, or in place of, the hardware already depicted. Computer 902 may be connected to any number of sensors or other components via a bus, network or other communications link.

Network 905 may be any suitable network and may support any appropriate protocol suitable for communication to the computer. Network 905 can include a combination of wired and wireless networks that the network computing environment of FIG. 9 may utilize for various types of network communications. For example, network 905 can include a local area network (LAN), a hotspot service provider network, a wide area network (WAN), the Internet, GPRS network or other cellular data network or cell-based radio network technology mobile network, an IEEE 802.11x wireless network or other type of network or combination thereof. For some implementations, network 905 may support the Ethernet IEEE 802.3x specification. For some implementations, network 905 may support IP (Internet Protocol) over either or UDP (User Datagram Protocol).

For some implementations, a mobile automated system can communicate with a central management system 920 via network 905 to communicate data to and receive data and commands. For example, computer 902 may send status information, alerts, collected data and other information to central management system 920. Similarly, computer 902 can receive updated routing information, maintenance plans, decision algorithms or other information from central management system 920. For some implementations, code 907 implements watchers to watch for various commands from central management system 920.

For some implementations, a mobile automated system may operate in various states including, but not limited to an autonomy state and a remote-control state. In an autonomous state, the mobile automated system (e.g., under the control of computer 902) performs autonomous navigation to generate paths, generate routes, follow routes, implement maintenance plans or take other actions without human intervention. Autonomous navigation can include route following, collision avoidance and other aspects of autonomous navigation. In some cases, the mobile automated system may encounter a situation that requires intervention, such as becoming stuck or encountering an obstacle that the mobile automated system cannot navigate around. The mobile automated system can send alerts to central management system 920 and, in some cases, await further instructions before moving again.

Central management system 920 may communicate with computer 902 to update the mobile automated system, put the mobile automated system in a manual state or carry out other actions. Central management system 920 can provide an interface, such as a web page or mobile application page, through which an operator can control the mobile automated system in the manual state. Commands entered by the operator (e.g., movement commands or other commands) are routed to computer 902 over network 905 and computer 902 controls the mobile automated system to implement the commands. Central management system 920 can further return the mobile automated system to an autonomous state. Central management system 920 may provide a centralized management for a large number of geographically dispersed mobile automated systems.

Central management system 920 may be one instance of management system 106. Central management system 920 includes a processor 954, a storage device 956, an output device 960, an input device 962, and a network interface device 964 connected via a bus 966. Processor 954 represents a central processing unit of any type of processing architecture, such as CISC (Complex Instruction Set Computing), RISC (Reduced Instruction Set Computer), VLIW (Very Long Instruction Word), a hybrid architecture, or a parallel architecture. Any appropriate processor may be used. Processor 954 executes instructions and may include that portion of the computer that controls the operation of the entire computer. Processor 954 may include a control unit that organizes data and program storage in memory and transfers data and other information between the various parts of the computer. The processor receives input data from the input device 962 and the network, reads and stores code and data in the storage device 906 and outputs data to the output devices 960. While a single processor, input device, storage device output device and single bus are illustrated, Central management system 920 may have multiple processors, input devices, storage devices, output devices and busses with some or all performing different functions in different ways. Moreover, various secure communications approaches may be utilized, as well as other security measures known and appreciated by skilled artisans.

Storage device 956 represents one or more mechanisms for storing data. For example, storage device 956 may include read-only memory (ROM), random access memory (RAM), magnetic disk storage media, optical storage media, flash memory devices, solid state device storage media, and/or other machine-readable media. For some implementations, any appropriate type of storage device may be used. Multiple types of storage devices may be present. Additionally, multiple and different storage devices and types may be used in conjunction with each other to perform data storage functions for the computer. Further, although the computer is drawn to contain the storage device, it may be distributed across other computers communicatively coupled over a suitable network, for example on a remote server.

Storage device stores code 957 and data items 958 therein. Code 957 can include instructions executable by processor 954 to carry out various functionality described herein. For some implementations, code 957 is executable to implement a command center application. For some implementations, code 957 is executable to implement a mow pattern planner. For some implementations, code 957 is executable to implement a path generator. For some implementations, code 957 is executable to implement a route generator. For some implementations, some or all of the functions are carried out via hardware in lieu of a processor-based system. As will be understood by those of ordinary skill in the art, the storage device may also contain additional software and data (not shown). Data items 958 can include a wide variety of data including, but not limited to, configuration data, data collected from the autonomous mower, data provided to central management system 920 by other systems, maintenance plans, path information, and other data. Although the code 957 and the data items 958 as shown to be within the storage device 956, some or all of them may be distributed across other systems communicatively coupled over the network.

Output device 960 represents devices that output data to a user or direct data to be sent to other systems connected through the network. The output may be a liquid crystal display (LCD), in one example, though any suitable display device may be used. For some implementations, an output device displays a user interface. Any number of output devices can be included, including output devices intended to cause data to be sent to other systems connected through network 905. Input device 962 represents one or more devices that provide data to processor 954. Input device 962 can represent user input devices (e.g., keyboards, trackballs, keypads and the like), sensors or other input devices.

The network interface device 964 connects between central management system 920 and network 905 through any suitable communications protocol. The network interface device 964 sends and receives data items from the network. Bus 966 may represent one or more busses, e.g., USB (Universal Serial Bus), PCI (Peripheral Component Interconnect), ISA (Industry Standard Architecture), X-Bus, EISA (Extended Industry Standard Architecture), MCA (Micro Channel Architecture), IEEE 994, or any other appropriate bus and/or bridge.

Central management system 920 may be implemented using any suitable hardware and/or software. For some implementations, central management system 920 may be implemented according to a cloud-based architecture. Peripheral devices such as auto adapters or chip programming devices, such as EPROM (Erasable Programmable Read-Only Memory) programming devices may be used in addition to, or in place of the hardware already depicted. Central management system 920 may be connected to any number of sensors or other components via a bus, network or other communications link.

Figure 10:
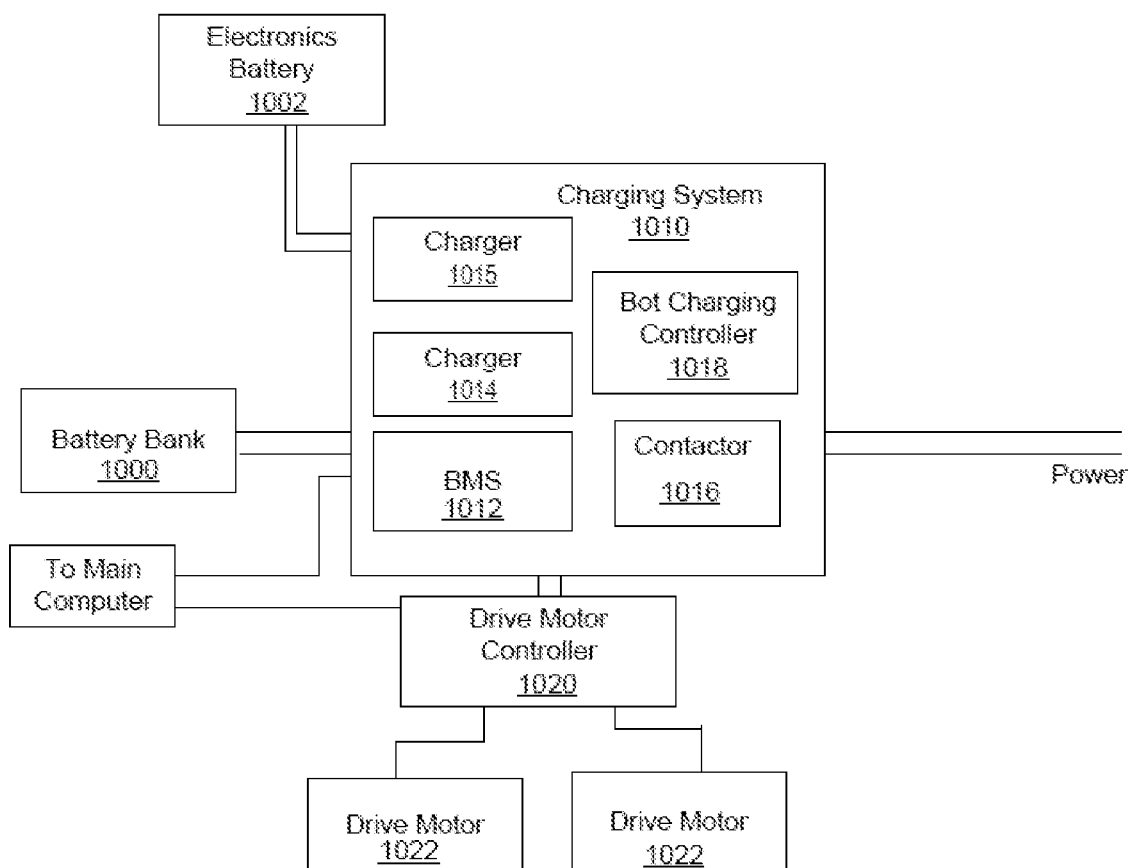
FIG. 10 is a block diagram illustrating exemplary power and drive components for an autonomous vehicle, an autonomous robot, an autonomous mower, or other autonomous system representative of the various implementations disclosed herein.

FIG. 10 is a block diagram illustrating exemplary power and drive components for an autonomous vehicle, an autonomous robot, an autonomous mower, or other autonomous system representative of the various implementations disclosed herein. More specifically, FIG. 10 is a block diagram illustrating exemplary power and drive components for an autonomous vehicle, an autonomous robot, an autonomous mower, or other autonomous system representative of the various implementations disclosed herein. More specifically, FIG. 10 is a block diagram illustrating select implementations of power and drive components of a robot, such as autonomous mower 310 or autonomous mower 700 or other mobile automated system. With regard to FIG. 10, the robot includes a main battery bank 1000 having one or more battery modules (for example one or more lithium ion or other rechargeable battery modules). The number of modules needed may be increased or decreased for a variety of reasons, including, but not limited to, altering the amount of power for the maintenance system based on the location of the maintenance system, and run time needed for the maintenance system and any attached devices. For some implementations, the robot contains 8 48 V battery modules, with each having approximately 2850 kWh of power. As will be well understood by one of ordinary skill in the art, the efficiency of battery systems may increase over time, and any number of battery modules may be used.

The battery modules of main battery bank 1000 may be a higher voltage than supported by computers (e.g., main computer 802), actuators, various electronics or other components of the mobile automated system. For some implementations, the robot can include one or more secondary batteries 1002 to power the main computer 802, various sensors, electronics, logic relays and other components. For example, or some implementations a robot may include a common car, motorcycle, Gel cell battery or the like.

As illustrated in FIG. 10, the robot can include a charging system 1010 that includes various components involved in charging the batteries. The charging can be an example of charging system 830. As illustrated, the charging system includes battery management system (BMS) 1012, charger 1014, contactor 1016 and bot charging controller 1018. Various components of the charging system can be connected to a bot computer (e.g., main computer 802) by a network or other communications link.

For some implementations, BMS 1012 is directly connected to battery bank 1000 and is adapted to manage and maintain batteries in battery bank 1000. As will be appreciated, BMS 1012 can provide various functions with respect to the rechargeable batteries of main battery bank 1000. By way of example, BMS 1012 can provide constant monitoring of charge balance, generate alerts, and implement preventive action to ensure proper charging. For some implementations, BMS 1012 assesses battery profiles for the battery modules of battery bank 1000 and the temperature of the battery modules, oversees balancing, performs monitoring of battery health and ensure battery bank 1000 is being charged in a safe manner (e.g., not being overcharged, not exceeding temperature limits, etc.). For some implementations, a bot computer (e.g., main computer 802) is connected to BMS 1012 (e.g., by a CAN or other communication link) and monitors/controls whether BMS 1012 allows charging.

The charging system further includes a charger 1014 to charge the batteries in battery bank 1000. Charger 1014 includes one or more chargers that have programmed profiles for the battery modules of battery bank 1000. Charger 1014 monitors the voltage of the battery bank 1000 and, if a charging voltage is out of range, stops charging. The charging system also includes a charger 1015 to charge secondary battery 1002 from main battery bank 1000. For some implementations, the charging system includes or is connected to a contactor 1016 that is electrically coupled to the charging contacts of the robot. Contactor 1016 can be selectively engaged and disengaged to allow charging when the bot is docked at a charging station.

The charging system includes a bot charging controller 1018 electrically coupled to the charging contacts. Bot charging controller 1018, for some implementations, is configured to determine when the robot has docked with a charging dock and engage/disengage contactor 1016 as needed to connect the charge power lines to charger 1014 and/or BMS 1012 to charge batteries in main battery bank 1000. For some implementations, the determination that the robot has docked successfully may be based, in part on a data communication between bot charging controller 1018 and a charging station controller. Such communication may be implemented according to any suitable protocol including power-line protocols or other protocols. To this end, bot charging controller 1018 may include a power-line communication or other adapter for communicating with the charging station.

The robot includes a drive motor controller 1020, which may be one example of drive motor controller 832. Drive motor controller 1020 is electrically connected to the drive motors 1022 that turn the drive wheels of the robot. For some implementations, drive motor controller 1020 distributes power from battery bank 1000 to drive motors 1022 based on commands from the main computer. For some implementations, drive motor controller 1020 is connected to the main battery bank 1000 through the charging system, for example, through BMS 1012 or other components.

Figure 11:
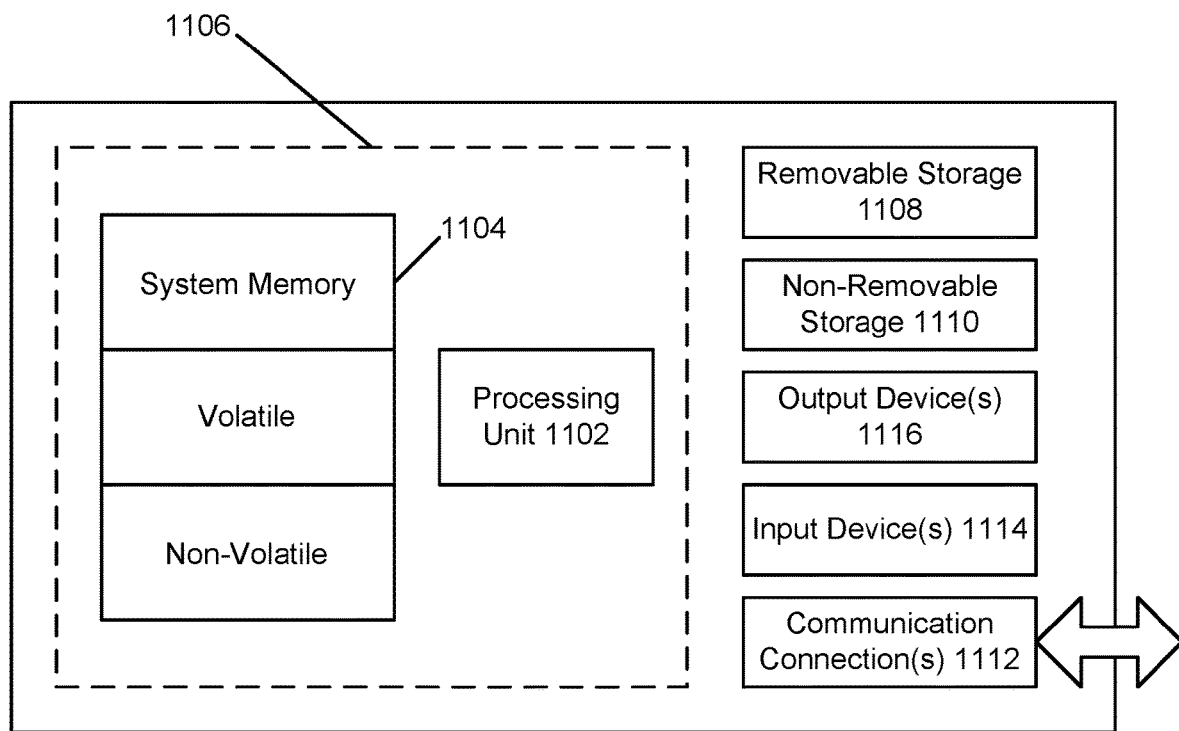
FIG. 11 is a block diagram of an example computing environment that may be used in conjunction with any of the various implementations and aspects herein disclosed.

FIG. 11 is a block diagram of an example computing environment that may be used in conjunction with example implementations and aspects such as those disclosed and described with regard to FIGS. 1-10. The computing system environment is only one example of a suitable computing environment and is not intended to suggest any limitation as to the scope of use or functionality.

Numerous other general purpose or special purpose computing system environments or configurations may be used. Examples of well-known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, and so forth that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA), an analog-to-digital converter (ADC), or other programmable logic device, discrete gate or transistor logic, discrete hardware components, discrete data acquisition components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

With reference to FIG. 11, an exemplary system for implementing aspects described herein includes a computing device, such as computing device 1100. In a basic configuration, computing device 1100 typically includes at least one processing unit 1102 and memory 1104. Depending on the exact configuration and type of computing device, memory 1104 may be volatile (such as random access memory (RAM)), non-volatile (such as read-only memory (ROM), flash memory, etc.), or some combination of the two. This basic configuration is illustrated in FIG. 11 by dashed line 1106 as may be referred to collectively as the "compute" component.

Computing device 1100 may have additional features/functionality. For example, computing device 1100 may include additional storage (removable and/or non-removable) including, but not limited to, magnetic or optical disks or tape. Such additional storage is illustrated in FIG. 11 by removable storage 1108 and non-removable storage 1110. Computing device 1100 typically includes a variety of computer readable media. Computer readable media can be any available media that can be accessed by device 1100 and may include both volatile and non-volatile media, as well as both removable and non-removable media.

Computer storage media include volatile and non-volatile media, as well as removable and non-removable media, implemented in any method or technology for storage of information such as computer readable instructions, data structures, program modules or other data. Memory 1104, removable storage 1108, and non-removable storage 1110 are all examples of computer storage media. Computer storage media include, but are not limited to, RAM, ROM, electrically erasable program read-only memory (EEPROM), flash memory or other memory technology, CD-ROM, digital versatile disks (DVD), or other optical storage, magnetic cassettes, magnetic tape, magnetic disk storage or other magnetic storage devices, or any other medium which can be used to store the information and which can be accessed by computing device 1100. Any such computer storage media may be part of computing device 1100.

Computing device 1100 may contain communication connection(s) 1112 that allow the device to communicate with other devices. Computing device 1100 may also have input device(s) 1114 such as a keyboard, mouse, pen, voice input device, touch input device, and so forth. Output device(s) 1116 such as a display, speakers, printer, and so forth may also be included. All these devices are well-known in the art and need not be discussed at length herein. Computing device 1100 may be one of a plurality of computing devices 1100 inter-connected by a network. As may be appreciated, the network may be any appropriate network, each computing device 1100 may be connected thereto by way of communication connection(s) 1112 in any appropriate manner, and each computing device 1100 may communicate with one or more of the other computing devices 1100 in the network in any appropriate manner. For example, the network may be a wired or wireless network within an organization or home or the like, and may include a direct or indirect coupling to an external network such as the Internet or the like. Moreover, PCI, PCIe, and other bus protocols might be utilized for embedding the various implementations described herein into other computing systems.

Interpretation of Disclosures Herein

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Certain implementations described herein may utilize a cloud operating environment that supports delivering computing, processing, storage, data management, applications, and other functionality as an abstract service rather than as a standalone product of computer hardware, software, etc. Services may be provided by virtual servers that may be implemented as one or more processes on one or more computing devices. In some implementations, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database, etc.) of a device that is actually providing the service (e.g., computing, storage). Users may access cloud services via, for example, a web browser, a thin client, a mobile application, or in other ways. To the extent any physical components of hardware and software are herein described, equivalent functionality provided via a cloud operating environment is also anticipated and disclosed.

Additionally, a controller service may reside in the cloud and may rely on a server or service to perform processing and may rely on a data store or database to store data. While a single server, a single service, a single data store, and a single database may be utilized, multiple instances of servers, services, data stores, and databases may instead reside in the cloud and may, therefore, be used by the controller service. Likewise, various devices may access the controller service in the cloud, and such devices may include (but are not limited to) a computer, a tablet, a laptop computer, a desktop monitor, a television, a personal digital assistant, and a mobile device (e.g., cellular phone, satellite phone, etc.). It is possible that different users at different locations using different devices may access the controller service through different networks or interfaces. In one example, the controller service may be accessed by a mobile device. In another example, portions of controller service may reside on a mobile device. Regardless, controller service may perform actions including, for example, presenting content on a secondary display, presenting an application (e.g., browser) on a secondary display, presenting a cursor on a secondary display, presenting controls on a secondary display, and/or generating a control event in response to an interaction on the mobile device or other service. In specific implementations, the controller service may perform portions of methods described herein.

Anticipated Alternatives

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Moreover, it will be apparent to one skilled in the art that other implementations may be practiced apart from the specific details disclosed above.

The drawings described above and the written description of specific structures and functions below are not presented to limit the scope of what has been invented or the scope of the appended claims. Rather, the drawings and written description are provided to teach any person skilled in the art to make and use the inventions for which patent protection is sought. Those skilled in the art will appreciate that not all features of a commercial implementation of the inventions are described or shown for the sake of clarity and understanding. Skilled artisans will further appreciate that block diagrams herein can represent conceptual views of illustrative circuitry embodying the principles of the technology, and that any flow charts, state transition diagrams, pseudocode, and the like represent various processes which may be embodied in computer readable medium and so executed by a computer or processor, whether or not such computer or processor is explicitly shown. The functions of the various elements including functional blocks may be provided through the use of dedicated electronic hardware as well as electronic circuitry capable of executing computer program instructions in association with appropriate software. Persons of skill in this art will also appreciate that the development of an actual commercial implementation incorporating aspects of the inventions will require numerous implementation-specific decisions to achieve the developer's ultimate goal for the commercial implementation. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure.

It should be understood that the implementations disclosed and taught herein are susceptible to numerous and various modifications and alternative forms. Thus, the use of a singular term, such as, but not limited to, "a" and the like, is not intended as limiting of the number of items. Also, the use of relational terms, such as, but not limited to, "top," "bottom," "left," "right," "upper," "lower," "down," "up," "side," and the like, are used in the written description for clarity in specific reference to the drawings and are not intended to limit the scope of the invention or the appended claims. For particular implementations described with reference to block diagrams and/or operational illustrations of methods, it should be understood that each block of the block diagrams and/or operational illustrations, and combinations of blocks in the block diagrams and/or operational illustrations, may be implemented by analog and/or digital hardware, and/or computer program instructions. Computer programs instructions for use with or by the implementations disclosed herein may be written in an object oriented programming language, conventional procedural programming language, or lower-level code, such as assembly language and/or microcode. The program may be executed entirely on a single processor and/or across multiple processors, as a stand-alone software package or as part of another software package. Such computer program instructions may be provided to a processor of a general-purpose computer, special-purpose computer, ASIC, and/or other programmable data processing system. The executed instructions may also create structures and functions for implementing the actions specified in the mentioned block diagrams and/or operational illustrations. In some alternate implementations, the functions/actions/structures noted in the drawings may occur out of the order noted in the block diagrams and/or operational illustrations. For example, two operations shown as occurring in succession, in fact, may be executed substantially concurrently or the operations may be executed in the reverse order, depending on the functionality/acts/structure involved.

The term "computer-readable instructions" as used above refers to any instructions that may be performed by the processor and/or other components. Similarly, the term "computer-readable medium" refers to any storage medium that may be used to store the computer-readable instructions. Such a medium may take many forms, including, but not limited to, non-volatile media, volatile media, and transmission media. Non-volatile media may include, for example, optical or magnetic disks, such as the storage device. Volatile media may include dynamic memory, such as main memory. Transmission media may include coaxial cables, copper wire and fiber optics, including wires of the bus. Transmission media may also take the form of acoustic or light waves, such as those generated during radio frequency (RF) and infrared (IR) data communications. Common forms of computer-readable media may include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

In the foregoing description, for purposes of explanation and non-limitation, specific details are set forth—such as particular nodes, functional entities, techniques, protocols, standards, etc.—in order to provide an understanding of the described technology. In other instances, detailed descriptions of well-known methods, devices, techniques, etc. are omitted so as not to obscure the description with unnecessary detail. All statements reciting principles, aspects, embodiments, and implementations, as well as specific examples, are intended to encompass both structural and functional equivalents, and such equivalents include both currently known equivalents as well as equivalents developed in the future, i.e., any elements developed that perform the same function, regardless of structure. While the disclosed implementations have been described with reference to one or more particular implementations, those skilled in the art will recognize that many changes may be made thereto. Therefore, each of the foregoing implementations and obvious variations thereof is contemplated as falling within the spirit and scope of the disclosed implementations, which are set forth in the claims presented below.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

What is claimed:

1. A system for an autonomous vehicle to navigate over terrain having a ground-based navigational obstacle, the system comprising at least one subsystem configured for:
   detecting a navigational obstacle in the direction of travel of the autonomous vehicle by at least raising a cantilevered deck disposed forward relative to the direction of travel;
   determining a navigational solution for overcoming the detected navigational obstacle; and
   performing the navigational solution to traverse the navigational obstacle.

2. The system of claim 1, wherein the detecting is performed by a sensor that is, or that is located on, a cantilever of the autonomous vehicle that is forward of the autonomous vehicle relative to the direction of travel.

3. The system of claim 2, wherein the autonomous vehicle is an autonomous mower, and wherein the cantilever is a cantilevered mowing deck.

4. The system of claim 2, wherein the autonomous vehicle is capable of elevating the cantilever, and wherein the navigational solution comprises elevating the cantilever.

5. The system of claim 1, wherein the detector comprises a drop sensor for detecting a negative obstacle.

6. The system of claim 5, wherein the drop sensor comprises a ride wheel.

7. The system of claim 1, wherein the detector comprises a strain gauge for detecting a positive obstacle.

8. The system of claim 1, wherein the detector comprises a bump bar for detecting a positive obstacle.

9. The system of claim 1, further comprising mapping the navigational obstacle.

10. A method for an autonomous vehicle to navigate over terrain, the method comprising:
    detecting a ground-based navigational obstacle in the direction of travel of the autonomous vehicle by at least raising a cantilevered deck disposed forward relative to the direction of travel;
    determining a navigational solution for overcoming the detected navigational obstacle; and
    performing the navigational solution to traverse the navigational obstacle.

11. The method of claim 10, wherein the detecting is performed by a sensor that is, or that is located on, a cantilever of the autonomous vehicle that is forward of the autonomous vehicle relative to the direction of travel.

12. The method of claim 11, wherein the autonomous vehicle is an autonomous mower, and wherein the cantilever is a cantilevered mowing deck.

13. The method of claim 11, wherein the autonomous vehicle is capable of elevating the cantilever, and wherein the navigational solution comprises elevating the cantilever.

14. The method of claim 10, wherein the detector comprises a drop sensor for detecting a negative obstacle.

15. The method of claim 14, wherein the drop sensor comprises a ride wheel.

16. The method of claim 10, wherein the detector comprises a strain gauge for detecting a positive obstacle.

17. The method of claim 10, wherein the detector comprises a bump bar for detecting a positive obstacle.

18. The method of claim 10, further comprising mapping the navigational obstacle.

19. A non-transitory computer-readable medium comprising computer-executable instructions for an autonomous vehicle to navigate over terrain, the computer-executable instructions comprising instructions for:
    detecting a ground-based navigational obstacle in the direction of travel of the autonomous vehicle;
    determining a navigational solution for overcoming the detected navigational obstacle by at least raising a cantilevered deck disposed forward relative to the direction of travel; and
    performing the navigational solution to traverse the navigational obstacle.

20. The computer-readable instructions of claim 19, further comprising instructions for mapping the navigational obstacle.

* * * * *